(12) United States Patent
Sekiguchi et al.

(10) Patent No.: US 6,633,611 B2
(45) Date of Patent: *Oct. 14, 2003

(54) METHOD AND APPARATUS FOR REGION-BASED MOVING IMAGE ENCODING AND DECODING

(75) Inventors: Shunichi Sekiguchi, Tokyo (JP); Yoshimi Isu, Tokyo (JP); Kohtaro Asai, Tokyo (JP)

(73) Assignee: Mitsubishi Denki Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 146 days.

(21) Appl. No.: 08/956,106

(22) Filed: Oct. 24, 1997

(65) Prior Publication Data

US 2003/0035477 A1 Feb. 20, 2003

(30) Foreign Application Priority Data

Apr. 24, 1997 (JP) .............................. 9-107072
Sep. 26, 1997 (JP) .............................. 9-261420

(51) Int. Cl.$^7$ ................................................ H04B 1/66
(52) U.S. Cl. .............................................. 375/240.16
(58) Field of Search .................. 375/240, 240.16, 375/240.17, 240.03, 240.05, 240.11; 348/384.1, 416.1, 466.1; 382/232, 233; H04B 1/66

(56) References Cited

U.S. PATENT DOCUMENTS

| | | | |
|---|---|---|---|
| 5,021,879 A | | 6/1991 | Vogel |
| 5,453,787 A | * | 9/1995 | Hancock et al. ............ 348/391 |
| 5,555,033 A | | 9/1996 | Bazzaz |
| 5,572,258 A | | 11/1996 | Yokoyama |
| 5,596,659 A | | 1/1997 | Normile et al. |
| 5,751,363 A | * | 5/1998 | Miyamoto ................ 348/416.1 |
| 5,852,469 A | * | 12/1998 | Nagai et al. ................. 348/384 |
| 5,896,176 A | * | 4/1999 | Das et al. .................... 348/416 |
| 5,917,949 A | * | 6/1999 | Chun et al. .................. 382/236 |
| 5,974,187 A | * | 10/1999 | Lee ............................ 382/242 |
| 5,995,668 A | * | 11/1999 | Corset et al. ................ 382/233 |
| 6,088,397 A | * | 7/2000 | Jeannin ....................... 375/240 |
| 6,205,260 B1 | * | 3/2001 | Crinon et al. ................ 382/284 |

FOREIGN PATENT DOCUMENTS

| | | |
|---|---|---|
| EP | 306250 A1 | 3/1989 |
| EP | 061955 2 A1 | 10/1994 |

(List continued on next page.)

OTHER PUBLICATIONS

IEEE Transactions on Circuits and Systems for Video Technology, "The MPEG–4 Video Standard Verification Model", Thomas Sikora, vol. 7, No. 1, Feb. 1997, S. 19 bis 31.

(List continued on next page.)

Primary Examiner—Chris Kelley
Assistant Examiner—Tung Vo

(57) ABSTRACT

In partitioning and encoding an image into multiple regions, the degree of freedom of the region shape has generally been low and setting regions based on image features was difficult. A moving image encoding apparatus includes a region partitioning section, an encoder, and a memory for motion-compensated prediction. The region partitioning section includes a partitioning processing section and a integration processing section. The partitioning processing section partitions the input image based on a criterion relating to the state of partition. The integration processing section integrates mutually close regions based on a criterion relating to the state of integration. Thereafter, each region is encoded. A large variety of region shapes can be produced by the integration processing section.

18 Claims, 21 Drawing Sheets

FOREIGN PATENT DOCUMENTS

| | | |
|---|---|---|
| EP | 090446 39 | 8/1995 |
| EP | 753970 A2 | 1/1997 |
| EP | 757334 A2 | 2/1997 |
| EP | 806870 A2 | 11/1997 |
| FR | 262886 4 | 9/1989 |
| JP | 6-169449 A | 6/1994 |
| JP | 8-46968 A | 2/1996 |
| JP | 9-507347 A | 7/1997 |
| JP | 1008621 A | 4/1998 |
| WO | WO 95/14349 A | 7/1994 |
| WO | 9717797 | 5/1997 |

OTHER PUBLICATIONS

"The Principle and Application of Data Compression", published by Zhu Lin Publishings, May 1996.

International Telecommunication Union; "Line Transmission of Non–telephone Signals"; DRAFT–ITU–T Recommendation H.263 (Dec. 5, 1995).

L.C. Real et al; "A Very Low Bit Rate Video Coder Based on Vector Quantization"; IEEE Transactions on Image Processing; vol. 5; No. 2; (Feb. 2, 1996); pp. 263 through 273.

* cited by examiner

METHOD AND APPARATUS FOR REGION-BASED MOVING IMAGE ENCODING AND DECODING

BACKGROUND OF THE INVENTION

1. Field of the Invention

This invention relates to a method and apparatus for inputting and encoding a moving image and to an apparatus for decoding the encoded moving image. This invention particularly relates to a technique for encoding an image frame by first partitioning it into multiple regions and to a technique for decoding the encoded image frame.

2. Description of the Related Art

FIG. 1 is a block diagram of a first prior art showing the configuration of a moving image encoder based on ITU-T recommendation H.263, wherein numeral 1 indicates an input digital image signal (hereinafter referred to simply as an input image), numeral 101 indicates a differentiator, numeral 102 indicates a prediction signal, numeral 103 indicates a prediction error signal, numeral 104 indicates an encoder, numeral 105 indicates encoded data, numeral 106 indicates a decoder, numeral 107 indicates a decoded prediction error signal, numeral 108 indicates an adder, numeral 109 indicates a local decoded image signal, numeral 110 indicates a memory, numeral 111 indicates a prediction section, and numeral 112 indicates a motion vector.

The input image 1 to be encoded is first input to differentiator 101. Differentiator 101 takes the difference between input image 1 and prediction signal 102 for output as prediction error signal 103. Encoder 104 encodes input image 1, which is an original signal, or prediction error signal 103, and outputs encoded data 105. The encoding method in encoder 104 employs a technique in the above-mentioned recommendation where prediction error signal 103 is transformed from a space region to a frequency region using Discrete Cosine Transformation (DCT), a type of orthogonal transformation, and the obtained transformation coefficient is linearly quantized.

Encoded data 105 is branched into two directions, where one is transmitted to a receiver, or an image decoding apparatus (not shown) and the other is input to decoder 106 within the present apparatus. Decoder 106 performs an operation which is the opposite of encoder 104, and generates and outputs decoded prediction error signal 107 from encoded data 105. Adder 108 adds prediction signal 102 with decoded prediction error signal 107 and outputs the result as decoded image signal 109. Prediction section 111 performs motion-compensated prediction using input image 1 and decoded image signal 109 of the previous frame stored in memory 110, and outputs prediction signal 102 and motion vector 112. At this time, motion compensation is performed in block units of a fixed size called a macro block comprising 16×16 pixels. As an optional function for a block within a region having large movements, motion-compensated prediction can be performed with the macro block partitioned into four sub-block units of 8×8 pixels. The obtained motion vector 112 is transmitted toward the image decoding apparatus, and prediction signal 102 is sent to differentiator 102 and adder 108. According to this apparatus, the amount of data of the moving image can be compressed while maintaining image quality through the use of motion-compensated prediction.

In this prior art, the shape of the encoding unit region is limited to two types. Moreover, both shapes are rectangular. Therefore, there is naturally a limit in the encoding which can be adapted to the scene structure or features of an image. For example, if it is desired to increase the amount of code only for an object having large movements, it is preferable, although difficult in this prior art, to define a region having a shape identical to that of the object.

FIG. 2 is a block diagram of an image encoding apparatus concerning a second prior art. This apparatus is based on an encoding method that was proposed in "A Very Low Bit Rate Video Coder Based on Vector Quantization" by L. C. Real et al (IEEE Transactions on Image Processing, Vol. 5, No. 2, February 1996). In the same figure, numeral 113 indicates a region partitioning section, numeral 114 indicates a prediction section, numeral 115 indicates a region determination section, numeral 116 indicates encoding mode information including inter-frame encoding and intra-frame encoding information, numeral 117 indicates a motion vector, numeral 118 indicates an encoder, and numeral 119 indicates encoded data.

In this apparatus, input image 1 is first partitioned into multiple regions by region partitioning section 113. Region partitioning section 113 determines the size of regions in accordance with the motion-compensated prediction error. Region partitioning section 113 performs judgment using a threshold with regard to dispersion of the inter-frame signal and assigns small blocks to regions having large movement and large blocks to regions, such as backgrounds, having small movement from among ten types of block sizes of 4×4, 4×8, 8×4, 8×8, 8×16, 16×8, 16×16, 16×32, 32×16, and 32×32 prepared in advance. In concrete terms, a dispersion value is calculated by region determination section 115 for the prediction error signal obtained by prediction section 114, and based on it the block size is determined. Attribute information 116, such as region shape information and encoding mode information, as well as motion vector 117 are determined at this time, and the prediction error signal or the original signal is encoded by encoder 118 in accordance with the encoding mode information to yield encoded data 119. Subsequent processes arc the same as those of the first prior art.

This prior art is richer in processing flexibility than the first prior art from the viewpoint of preparing multiple sized blocks. However, this apparatus also limits each region to a rectangular shape. Therefore, even with rectangular shapes in ten sizes, there is room for improvement in adaptability with respect to arbitrarily shaped image regions.

SUMMARY OF THE INVENTION

The present invention takes into consideration these problems with the object of providing a moving image encoding technique for performing more flexible processing according to the conditions of the image to be processed. The object of this invention, in more concrete terms, is to provide a moving image encoding technique using region partitioning techniques that can accurately handle various image structures. Another object of this invention is to provide a partitioning criterion based on various points of view when partitioning regions for encoding. Still another object of this invention is to provide a technique for correctly decoding the encoded data of regions that have been partitioned into various shapes.

The moving image encoding method of this invention includes two steps. A first step partitions an input image into multiple regions based on a predetermined partitioning judgment criterion. Until this point, the encoding process is the same as the general conventional region-based encoding. However, in a second step, this invention integrates each of partitioned multiple regions with adjacent regions based on a predetermined integration judgment criterion. Thereafter, in a third step, the image signal is encoded for each of the regions remaining after integration. According to this method, the integration process allows regions to take on various shapes. Thus, a region having a shape closely matching the structure of an image or outline of an object can be generated.

The moving image encoding apparatus of this invention includes a region partitioning section and an encoder. The region partitioning section includes a partitioning processing section for partitioning the input image into multiple regions based on a predetermined partitioning judgment criterion, and a integration processing section for integrating each of multiple regions partitioned by the partitioning processing section with adjacent regions based on a predetermined integration judgment criterion. The encoder encodes the image signal for each of the regions remaining after integration by the integration processing section. According to this apparatus, a comparatively high image quality can be achieved at comparatively high data compression ratios while flexibly supporting the structures of images.

The above-mentioned integration processing section performs preliminary encoding and decoding of images for each region, and may examine the amount of code and the encoding distortion. In such a case, the encoding distortion can be minimized under the constraint of a predetermined amount of code.

The above-mentioned partitioning processing section includes a class identifying section for classifying the importance of regions into classes, and may judge whether or not to partition each region based on an activity to be described later and the class. If the class identifying section references feature parameters in images, the recognition of objects becomes possible thus facilitating more accurate region partitioning.

On the other hand, the moving image decoding apparatus of this invention inputs and decodes the encoded data of the image that was encoded after being partitioned into multiple regions. This apparatus includes a region shape restoring section and an image data decoder. The region shape restoring section restores, based on region shape information included in the encoded data, the shape of each region that was partitioned during encoding. The image data decoder, after specifying the sequence in which regions were encoded based on the shapes of the restored regions, decodes the image for each region from the encoded data. According to this apparatus, accurate decoding is achieved even if regions having various shapes are generated in the encoding stage.

DETAILED DESCRIPTION OF THE PREFERRED EMBODIMENTS

First Embodiment

Figure 3:
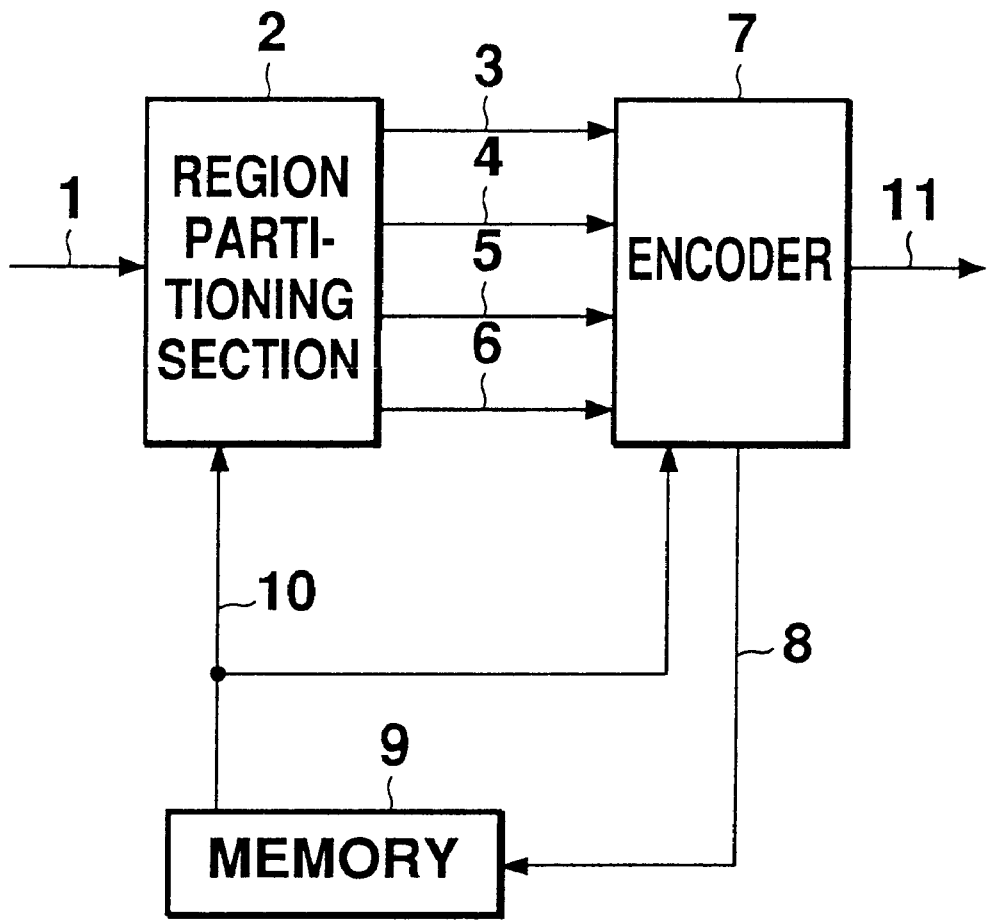
FIG. 3 is a block diagram common to general moving image encoding apparatus relating to an embodiment.

FIG. 3 is a block diagram showing a configuration of a moving image encoding apparatus related to this embodiment. This apparatus can be used in portable or stationary equipment for image communications, such as TV telephones and TV conferencing. It can also be used as a moving image encoding apparatus in image storage and recording apparatus such as digital VCRs and video servers. Furthermore, the processes in this apparatus can also be used as a moving image encoding program to be installed in the form of software or DSP firmware.

Figure 4:
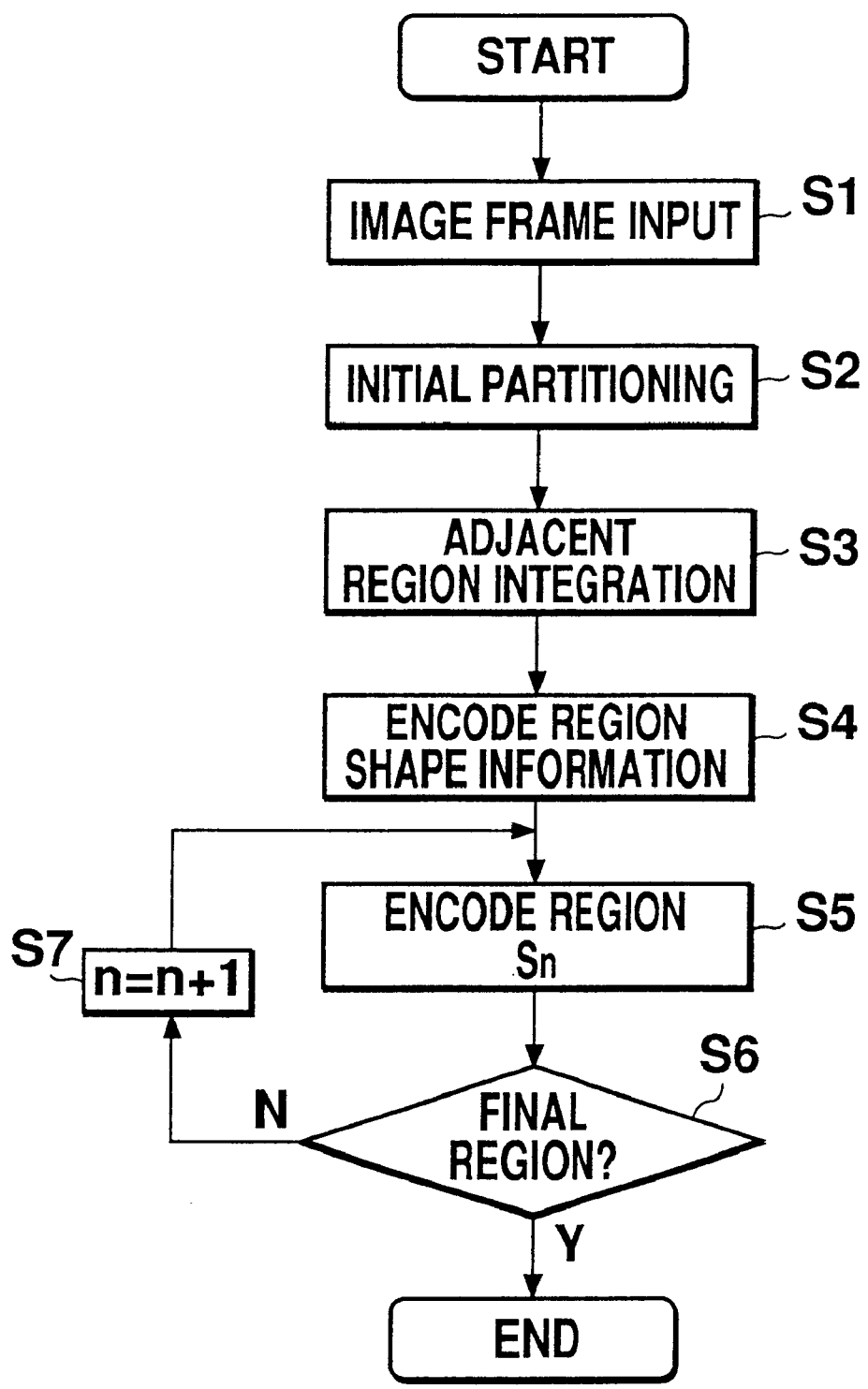
FIG. 4 is a flowchart showing an operation of the encoding apparatus of FIG. 3.

In FIG. 3, numeral 1 indicates the input image, numeral 2 indicates a region partitioning section, numeral 3 indicates region shape information, numeral 4 indicates a region image signal, numeral 5 indicates region motion information, numeral 6 indicates region attribute information, numeral 7 indicates an encoder, numeral 8 indicates a local decoded image, numeral 9 indicates a memory, numeral 10 indicates a reference image, and numeral 11 indicates an encoded bit stream. FIG. 4 is a flowchart showing an operation of the apparatus. The overall operation of the apparatus is first described with reference to FIGS. 3 and 4.

Input image 1 is input to region partitioning section 2 (S1) where it is partitioned into multiple regions. Region partitioning section 2 performs initial partitioning (S2) and adjacent region integrating (S3), as will to be described later. Region partitioning section 2 passes shape information 3, image signal 4, attribute information 6 such as encoding modes of the regions and, motion information 5 for each region obtained as a result of partitioning to encoder 7. Encoder 7 transforms and multiplexes these information items into a bit pattern based on a predetermined encoding method for output as encoded bit stream 11 (S4, S5). In order to perform region partitioning and encoding based on motion-compensated prediction, encoder 7 generates local decoded image 8 for each region and stores it into memory 9. Region partitioning section 2 and encoder 7 fetches the local decoded image stored in memory 9 as reference image 10 to perform motion-compensated prediction.

Figure 5:
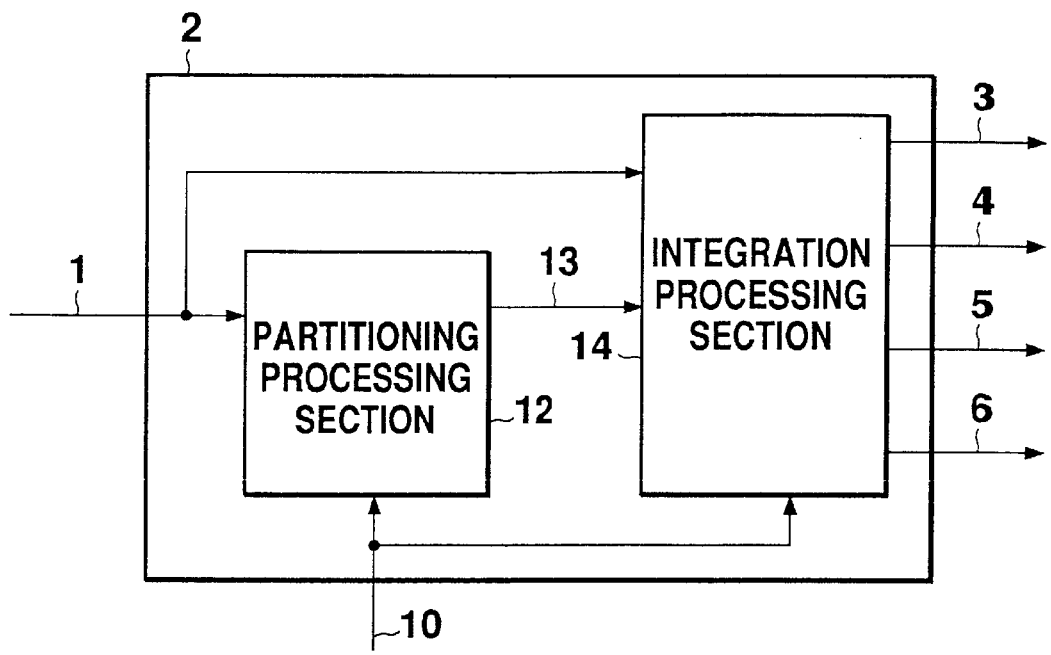
FIG. 5 is an internal block diagram of the region partitioning section of FIG. 3.

FIG. 5 is a detailed block diagram of region partitioning section 2 wherein numeral 12 indicates a partitioning processing section, numeral 13 indicates initial partition shape information, and numeral 14 indicates a integration processing section.

(1) Initial Partitioning

The initial partitioning corresponding to S2 of FIG. 4 is performed at partitioning processing section 12. Initial partitioning refers to the partitioning which is performed before proceeding to integration, and the total partitioning count is dependent on the state of the image, namely, the features or characteristics of the image.

Figure 6:
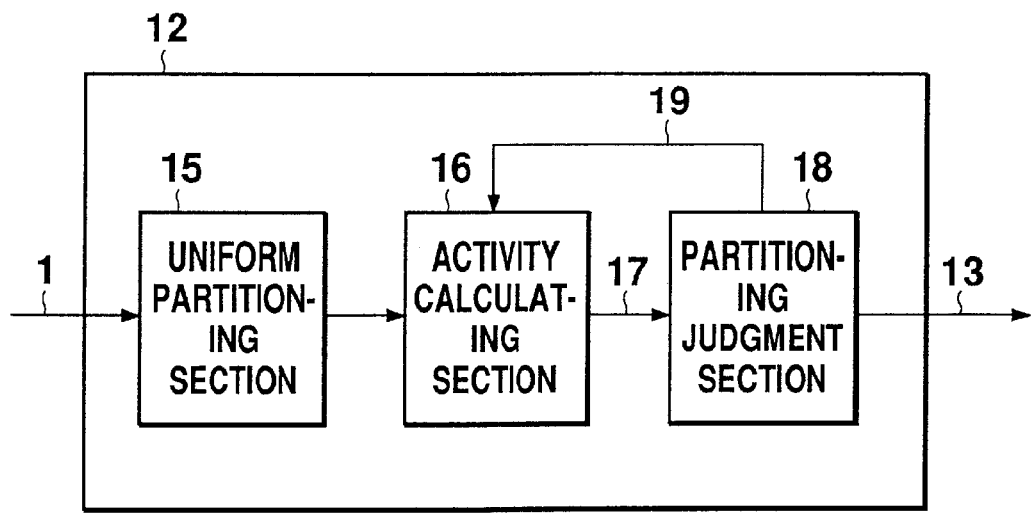
FIG. 6 is an internal block diagram of the partitioning processing section of FIG. 5.

FIG. 6 shows an internal configuration of partitioning processing section 12 wherein numeral 15 indicates a uniform partitioning section, numeral 16 indicates an activity calculating section, numeral 17 indicates an activity, numeral 18 indicates a partitioning judgment section, and numeral 19 indicates a partition state instruction signal. The activity refers to an evaluated value for judging the features or characteristics of the image regarding a predetermined property. A prediction error power accompanying motion-compensated prediction for a region is employed as the activity in this embodiment.

Figure 21:
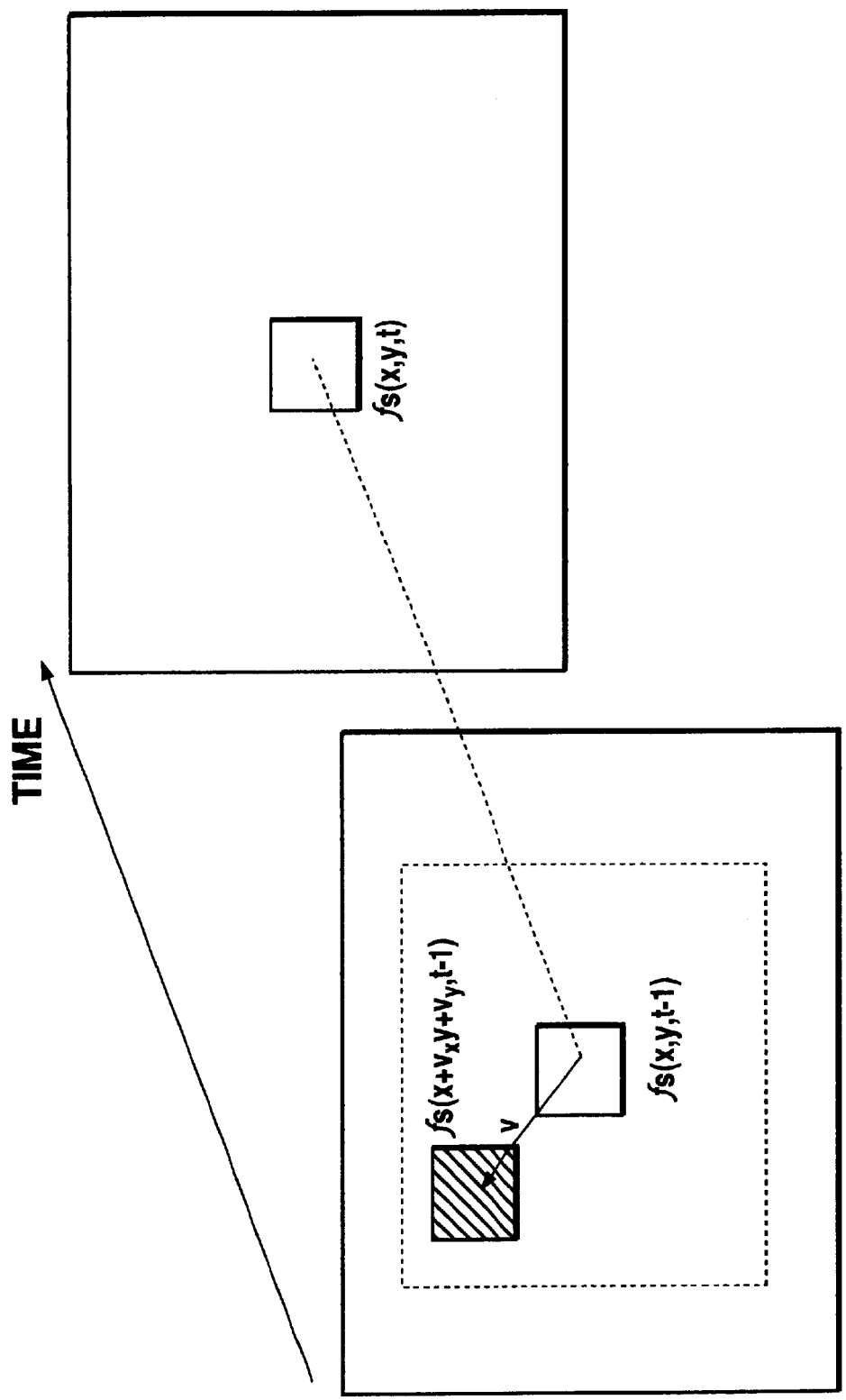
FIG. 21 shows motion-compensated prediction based on block matching.

FIG. 21 shows a method of motion-compensated prediction based on a block matching method. In the block matching method, vector v given in the following formula is found as the motion vector of the region S to be predicted.

$$D_{\min} = \min_{v \in R}\left(\sum_{S}[fs(x+v_x, y+v_y, t-1) - fs(x, y, t)]\right)$$

The term fs(x, y, t) is the pixel value on (x, y) at time t of the predicted region S, fs(x, y, t−1) is the pixel value on (x, y) at time t−1, and fs(x+$v_x$, y+$v_y$, t−1) is the pixel value of the position that is displaced from position (x, y, t−1) by the amount of vector v. R represents the motion vector search range.

From the obtained vector v, the prediction image is obtained by fs(x+$v_x$, y+$v_y$, t−1), and the prediction error power, or activity, becomes $D_{min}$. Defining the activity with this method enables region partitioning to be performed according to the complexity of the local motion of the image. Control becomes possible, such as for detailed encoding for portions having large movements and rough encoding for portions having small movements. Affine motion compensation for obtaining affine motion parameters and perspective motion compensation for detecting three-dimensional motion may be used.

Figure 7:
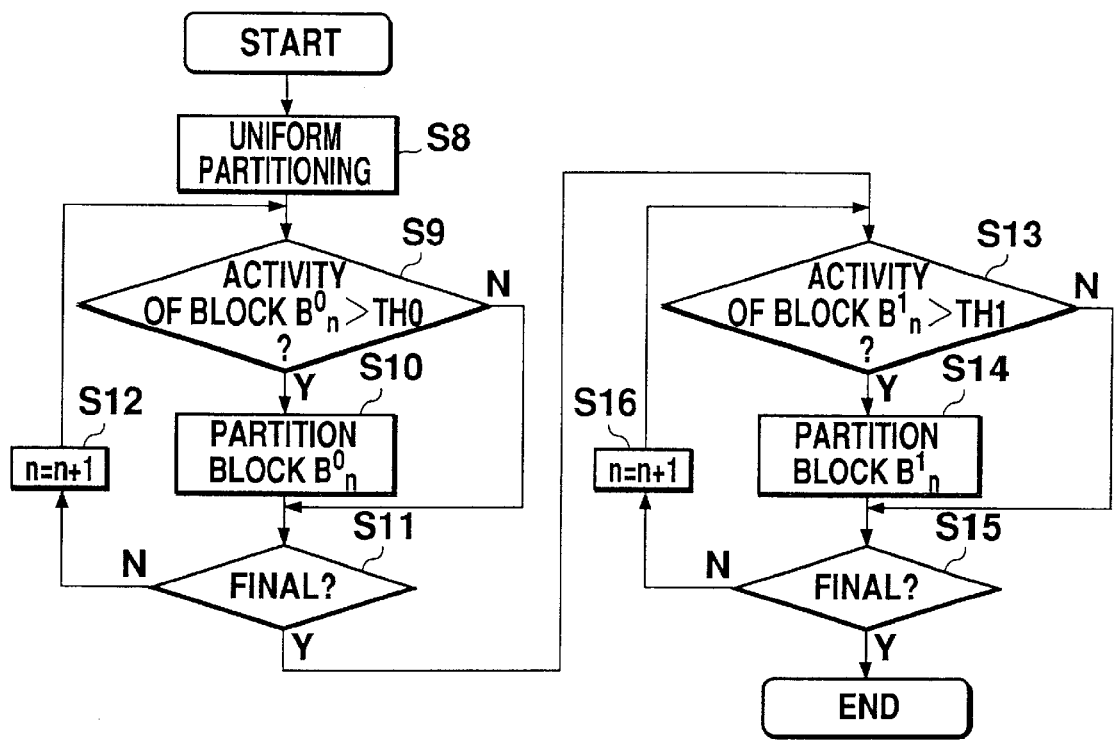
FIG. 7 is a flowchart showing an operation of the partitioning processing section of FIG. 6.
Figure 8:
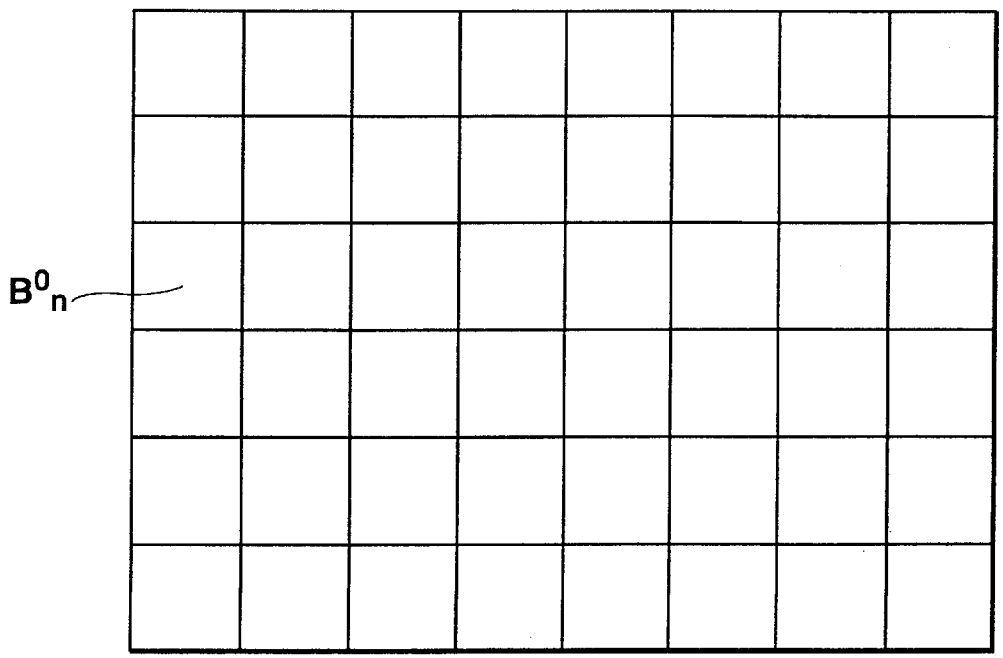
FIG. 8 shows an example of a uniform partitioning result in the partitioning processing section of FIG. 6.

FIG. 7 is a flowchart showing an operation of partitioning processing section 12 wherein unconditional uniform block partitioning is first performed (S8) by uniform partitioning section 15. At this time, one frame is partitioned, for example, into blocks of 32×32 pixels as shown in FIG. 8. This partitioning process is called a $0^{th}$ partitioning stage. The number of blocks generated in the $0^{th}$ partitioning stage is denoted by $N_0$ and each block by $B_n^0$ ($1 \leq n \leq N_0$).

Next, a judgment is made individually as to whether or not to perform further block partitioning for each $B_n^0$ (S9). For this purpose, activity 17 for each $B_n^0$ is calculated in activity calculating section 16. Partitioning judgment section 18 compares threshold TH0 that was set in advance with the activity of each block, and if activity 17 is larger than TH0, the corresponding $B_n^0$ is further partitioned into four blocks (S10). This is called a $1^{st}$ partitioning stage.

Figure 9:
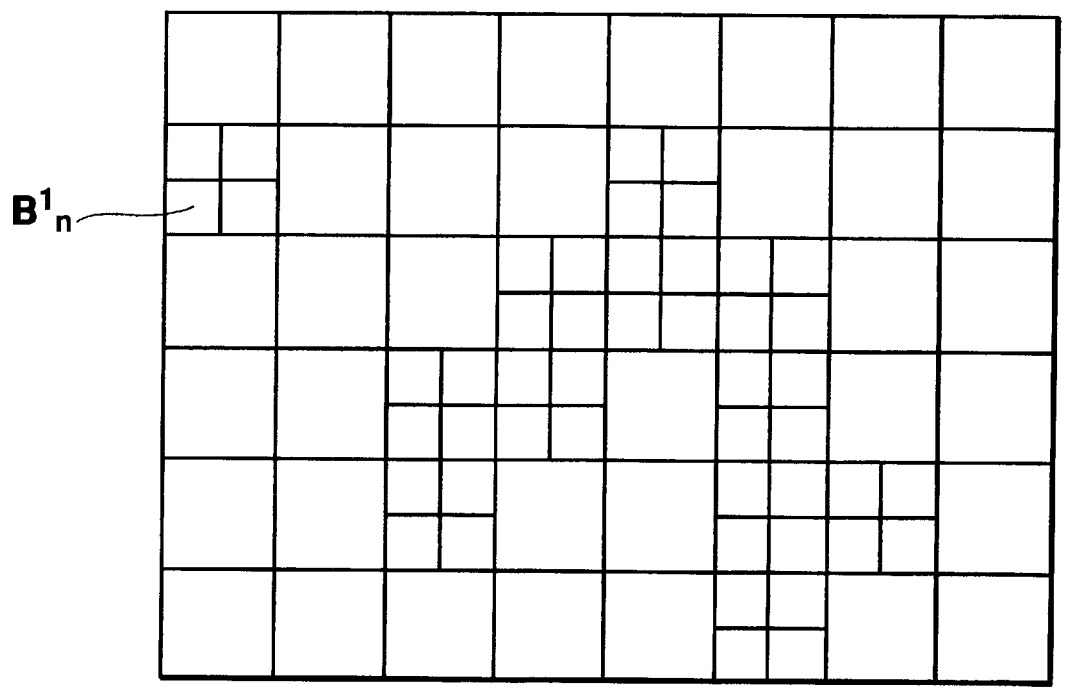
FIG. 9 shows a result of a first initial partitioning in the partitioning processing section of FIG. 6.
Figure 10:
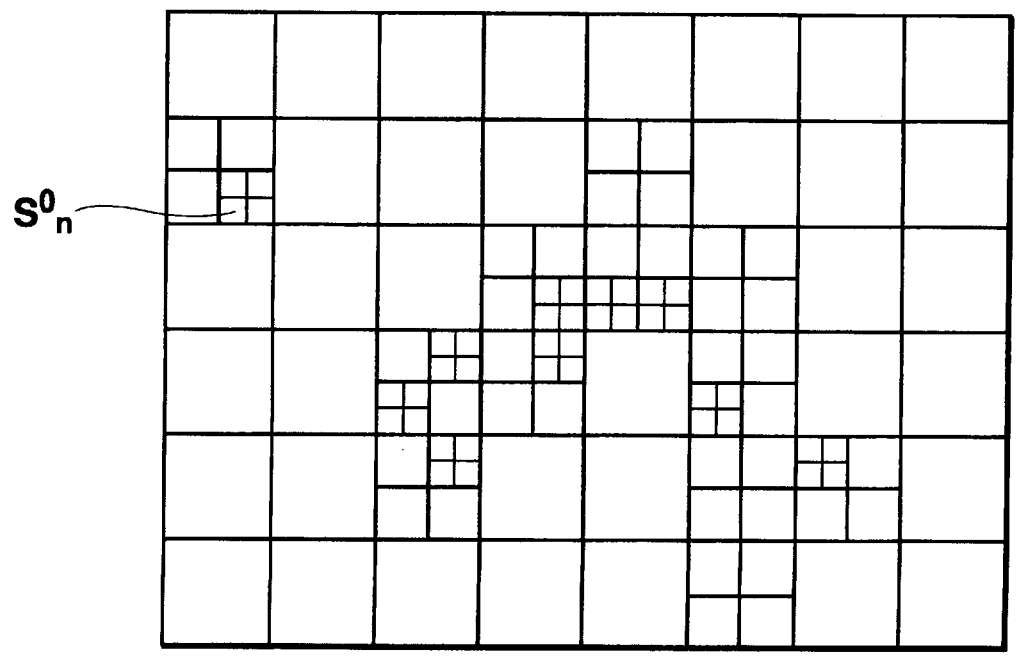
FIG. 10 shows a final result of initial partitioning in the partitioning processing section of FIG. 6.

FIG. 9 illustrates the partitioned image at the $1^{st}$ partitioning stage. The number of newly generated 16×16 pixel blocks is denoted by $N_1$ and each block by $B_n^1$ ($1 \leq n \leq N_1$). Hereafter, the activity of each $B_n^1$ is calculated and a $2^{nd}$ partitioning stage is performed using threshold TH1. Thereafter, threshold THj is applied to block $B_n^j$ generated in a $j^{th}$ partitioning stage and the $j+1^{th}$ partitioning stage is executed (S13 to S16). The initial partitioning is terminated when j reaches a predetermined upper limit value. It is assumed here for the purpose of description that the process is terminated at the end of the $2^{nd}$ partitioning stage. In this case, blocks as shown in FIG. 10 are generated. Block sizes range from 8×8 pixels to 32×32 pixels. The number of blocks at the end of initial partitioning is denoted by $M_0$ and the initial region of each block by $S_n^0$. The shape information for $S_n^0$ is passed to integration processing section 14 as initial partition shape information 13.

(2) Integrating Adjacent Regions

Figure 11:
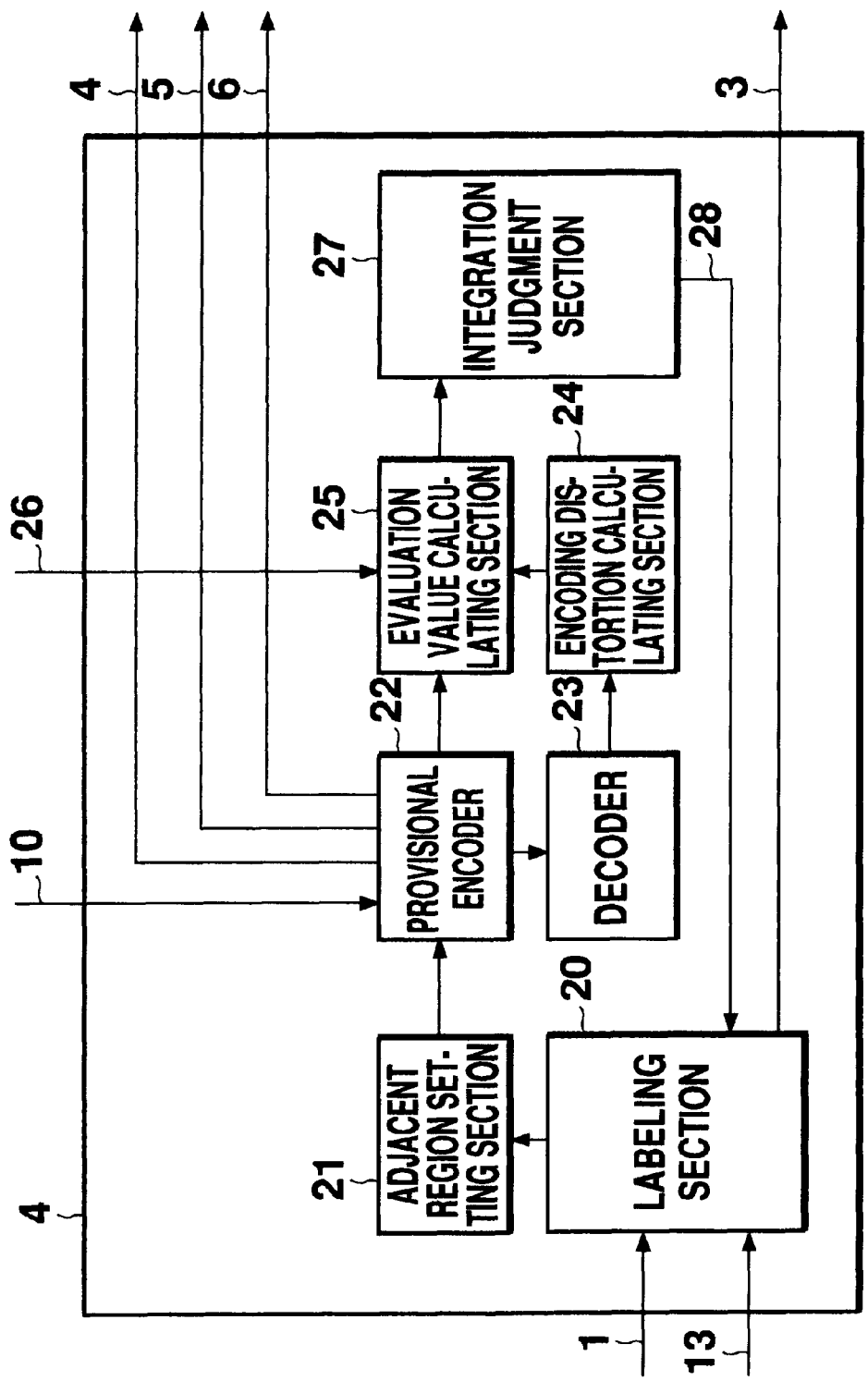
FIG. 11 is an internal block diagram of the integration processing section of FIG. 5.

Integration processing section 14 performs integration with adjacent regions for each $S_n^0$. The internal configuration of integration processing section 14 is shown in FIG. 11 wherein numeral 20 indicates a labeling section, numeral 21 indicates an adjacent region setting section, numeral 22 indicates a provisional encoder, numeral 23 indicates a decoder, numeral 24 indicates an encoding distortion calculating section, numeral 25 indicates an evaluation value calculating section, numeral 26 indicates a constant for evaluation value calculation, numeral 27 indicates a integration judgment section, and numeral 28 indicates a integration process iteration instruction signal.

Figure 12:
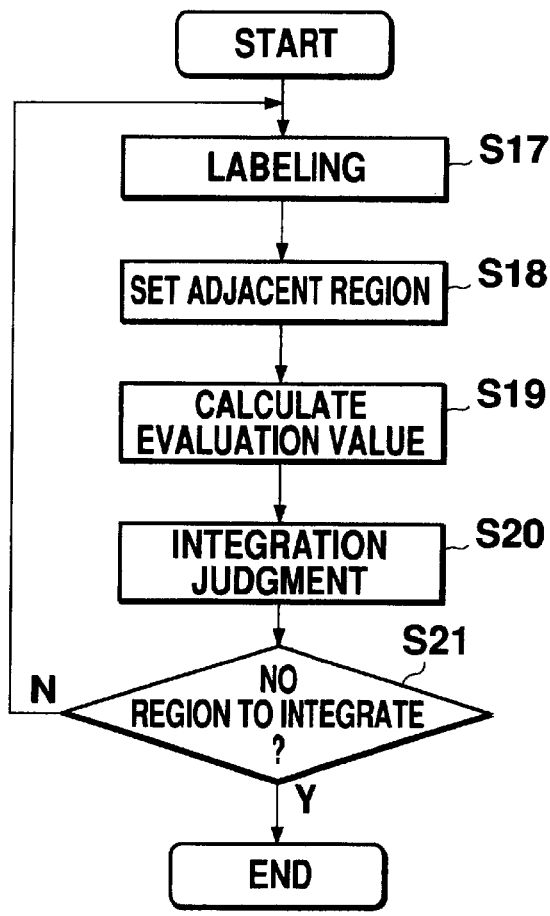
FIG. 12 is a flowchart showing an operation of the integration processing section of FIG. 11.
Figure 13:
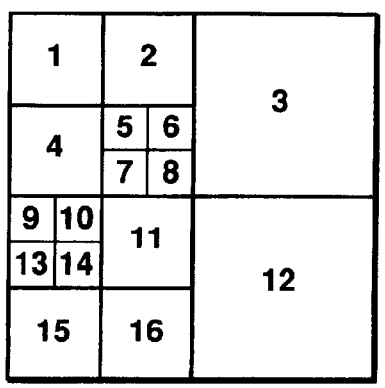
FIG. 13 shows an example of labeling a region in the integration processing section of FIG. 11.

FIG. 12 is a flowchart showing an operation of integration processing section 14. As shown in the flowchart, numbers or labels, are first assigned to initial regions $S_n^0$ by labeling section 20 in accordance to a predetermined rule (S17). For example, numbers are assigned in sequence to regions while the image frame is scanned horizontally in pixel units from the top left corner to the bottom right corner. A simple example of labeling is shown in FIG. 13 wherein labels "1", "2", and so forth are assigned to the regions in their sequence of appearance on the scanning line. At this time, region size is ignored. Hereinafter, the label value of region $S_n^k$ is denoted by l($S_n^k$). The k here corresponds to a $k^{th}$ partitioning stage to be described later, where the initial state is k=0.

Figure 14:
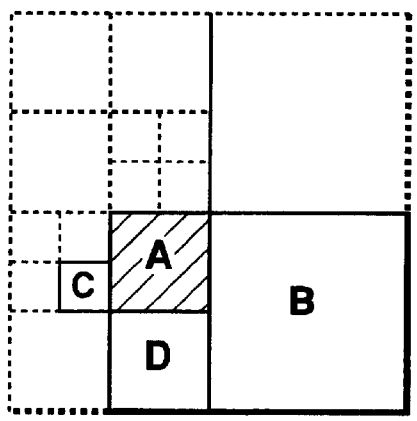
FIG. 14 shows an example of setting adjacent regions in the integration processing section of FIG. 11.

Next, the "adjacent regions" of each region are defined by adjacent region setting section 21 (S18) using labels. FIG. 14 is an example of adjacent regions wherein the adjacent regions of region $S_n^0$ are based on the labels of FIG. 13. Regions B, C, and D, which are adjacent to the edges of region A and have label values larger than that of region A, are defined as adjacent regions.

Next, a judgment is made for each region as to whether or not the region can be integrated with its adjacent regions. For this reason, an evaluation value for integration is calculated (S19) by provisional encoder 22, decoder 23, encoding distortion calculating section 24, and evaluation value calculating section 25. The evaluation value is amount of code—distortion cost $L(S_n^k)$ expressed in the following formula.

$$L(S_n^k)=D(S_n^k)+\lambda R(S_n^k) \qquad \text{Formula 1}$$

Here, $D(S_n^k)$ is the encoding distortion of $S_n^k$, namely, the square error summation, $R(S_n^k)$ is the amount of code of $S_n^k$, and $\lambda$ is the constant 26. The integration proceeds in the direction of decreasing $L(S_n^k)$. Decreasing $L(S_n^k)$ is equivalent to decreasing the encoding distortion within the range of the predetermined amount of code based on the given constant $\lambda$. Decreasing the summation of $L(S_n^k)$ enables the encoding distortion to be reduced when the same amount of code is used.

Figure 15:
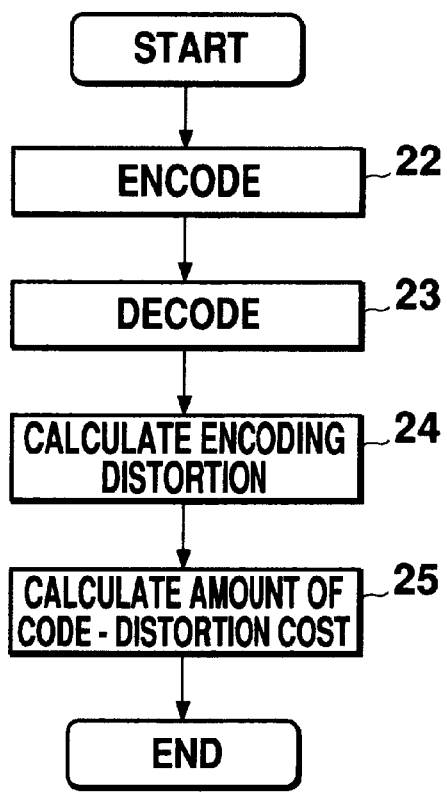
FIG. 15 is a flowchart showing the procedure of S19 of FIG. 12.

FIG. 15 is a detailed flowchart of S19. First, $S_n^k$ is preliminarily encoded (S22) at provisional encoder 22. The purpose of this encoding is to prepare for the calculation of the amount of code $R(S_n^k)$ and the derivation of encoding distortion $D(S_n^k)$. In this embodiment, provisional encoder 22 performs motion compensation using reference image 10. The data to be encoded includes image data, namely, the prediction error signal or original signal, motion information to specify the prediction image, and attribute information such as of the encoding mode, where the summation of the amounts of these codes is $R(S_n^k)$. The prediction error signal is obtained as the difference of the original signal of $S_n^k$ and the prediction image.

Decoder 23 generates the local decoded image for $S_n^k$ (S23) using the encoded data obtained by provisional encoder 22. Next, distortion $D(S_n^k)$ of the local decoded image and original image is calculated (S24) by encoding distortion calculating section 24. Evaluation value calculating section 25 calculates (S25) amount of code—distortion cost $L(S_n^k)$ from $R(S_n^k)$ and $D(S_n^k)$.

Step 19 performs the preceding evaluation value calculation for all regions for the three types of 1. Each region $S_n^k$ itself: $L(S_n^k)$
2. Adjacent regions $N_i[S_n^k]$ of $S_n^k$: $L(N_i[S_n^k])$
3. Region temporarily integrating $S_n^k$ and $N_i[S_n^k]$: $L(S_n^k+N_i[S_n^k])$ Here, $N_i[S_n^k]$ denotes an adjacent region of $S_n^k$, and i is a number for distinguishing the multiple adjacent regions.

Next, in integration judgment section 27, a location within the image frame where $$D_L=L(S_n^k)+L(N_i[S_n^k])-L(S_n^k+N_i[S_n^k])$$

is a maximum is searched for, and the corresponding $S_n^k$ and $N_i[S_n^k]$ are integrated (S20). This is the $k^{th}$ integration stage. Hereafter, integration judgment section 27 instructs labeling section 20 to update labels through integration process iteration instruction signal 28. Labeling section 20 replaces label $l(N_i[S_n^k])$ with $l(S_n^k)$, and again sets adjacent regions with adjacent region setting section 21. This yields new region $S_n^{k+1}$ and adjacent regions $N_i[S_n^{k+1}]$, thus determining $L(S_n^{k+1})$, $L(N_i[S_n^{k+1}])$, and $L(S_n^{k+1}+N_i[S_n^{k+1}])$. Integration judgment section 27 halts the instructions to labeling section 20 when there are no further combinations yielding positive values of $D_L$ and terminates the integration process (S21).

This terminates the processing for partitioning and integrating, and information 3 expressing the region partitioned state of input image 1, image data 4 for each region, motion information 5, and attribute information 6 is output to encoder 7. Hereafter, encoding is performed according to a predetermined encoding method.

In this embodiment, integrating was performed as well as partitioning and each region can be expressed as a set of rectangular blocks of various sizes. For example, an object within an image having large movements can be integrated into a single region having a shape similar to the outline of the object. As a result, the amount of code is controlled by changing the quantization parameter for each object so as to enable flexible handling of images based on their actual structures. Furthermore, optimum region partitioning which minimizes encoding distortion is achieved under a fixed amount of code. Thus, compared to the conventional moving image encoding apparatus, higher image quality can be achieved with a smaller amount of code.

Although the initial partitioning in this embodiment was terminated at the end of the $2^{nd}$ partitioning stage, it may of course be terminated at another stage. For example, if the overall movement of the image is small, the initial partitioning may be terminated at the $1^{st}$ stage and, if not, the number of stages may be increased. Furthermore, although image frames were encoded in this embodiment, it is also possible to apply this encoding in a similar manner to a rectangular image area including an object of arbitrary shape in the image frame.

For described encoder 7 and provisional encoder 22, the encoding of $S_n^k$ was performed through a combination of DCT and linear quantization. However, other encoding methods, such as vector quantization, sub-band encoding, or wavelet encoding, may be used. Multiple encoding methods may be prepared and a configuration selectively using the method having the best encoding efficiency may be employed.

Although prediction error power was adopted for the activity in this embodiment, other examples given below may be considered.

A first example is a dispersion value within the region. The dispersion value expresses the complexity of the pixel distribution of the region, and the dispersion value becomes larger for a region that includes images where pixel values, such as at edges, vary suddenly. Dispersion value $\sigma_s$ is given by the following formula when the pixel value within region S is set to fs(x, y, t) and the mean of pixel value within region S is set to $\mu_s$.

$$\sigma_s = \frac{1}{N}\sum_S [fs(x, y, t) - \mu_s]^2$$

By this activity, regions can be partitioned according to the complexity of the local structure of the image, and control is possible for detailed encoding of portions where pixel values change drastically and rough encoding of portions where pixel values change minimally.

A second example is the edge intensity within the region. The edge intensity can be solved using a Sobel operator as mentioned in "Edge detection by compass gradient masks" by G. Robinson (Journal of Computer Graphics and Image Processing, Vol. 6, No. 5, October 1977) as the number of pixels distributed on the edge or edge distribution area. In the case of this method, regions can be partitioned according to the edge structure of the image, and control is possible for detailed encoding of portions where edges are located and rough encoding of portions where edges do not exist.

As a third example, the magnitude of the motion parameter based on motion-compensated prediction of the region can be given. As a result of motion-compensated prediction, the motion parameter is obtained. This corresponds to vector v in the block matching method. According to this method, regions can be partitioned according to the degree of motion of the image, and control is possible for detailed encoding of portions where localized large movements occur, such as object regions, and rough encoding of portions where movements rarely occur, such as background regions.

A fourth example is the linear sum of the amount of code of the motion parameter based on motion-compensated prediction of the region and the prediction error power. The evaluation value of this case may be defined in the following formula.

$$L_{mc} = D_{mc} + \lambda R_{mc} \qquad \text{Formula 2}$$

Here, $D_{mc}$ is the prediction error power determined in the course of motion parameter detection, $\lambda$ is a constant, and $R_{mc}$ is the amount of code of the motion parameter. The motion parameter minimizing $L_{mc}$ is determined and the evaluation value at the time is set as the activity. According to this method, regions are partitioned so as to lower the total encoding cost including the amount of information of the motion parameter and the amount of information based on the complexity of motion of the image, enabling encoding of partitions to be performed with a small amount of information.

A fifth example is the linear sum of the activity values. By performing appropriate weighting for each activity, it becomes possible to handle a variety of images.

Figure 1:
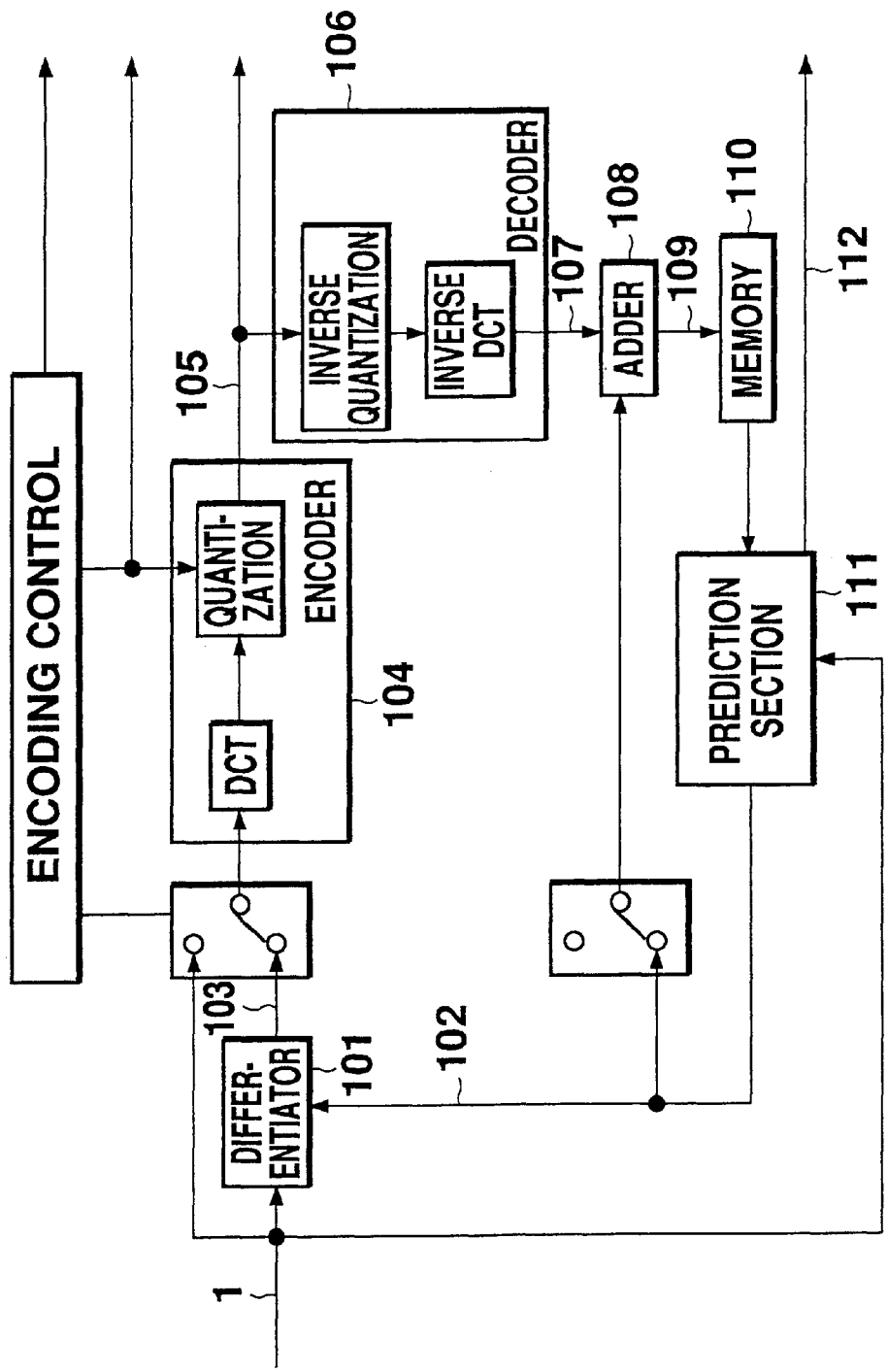
FIG. 1 shows a moving image encoding apparatus relating to a first prior art.
Figure 2:
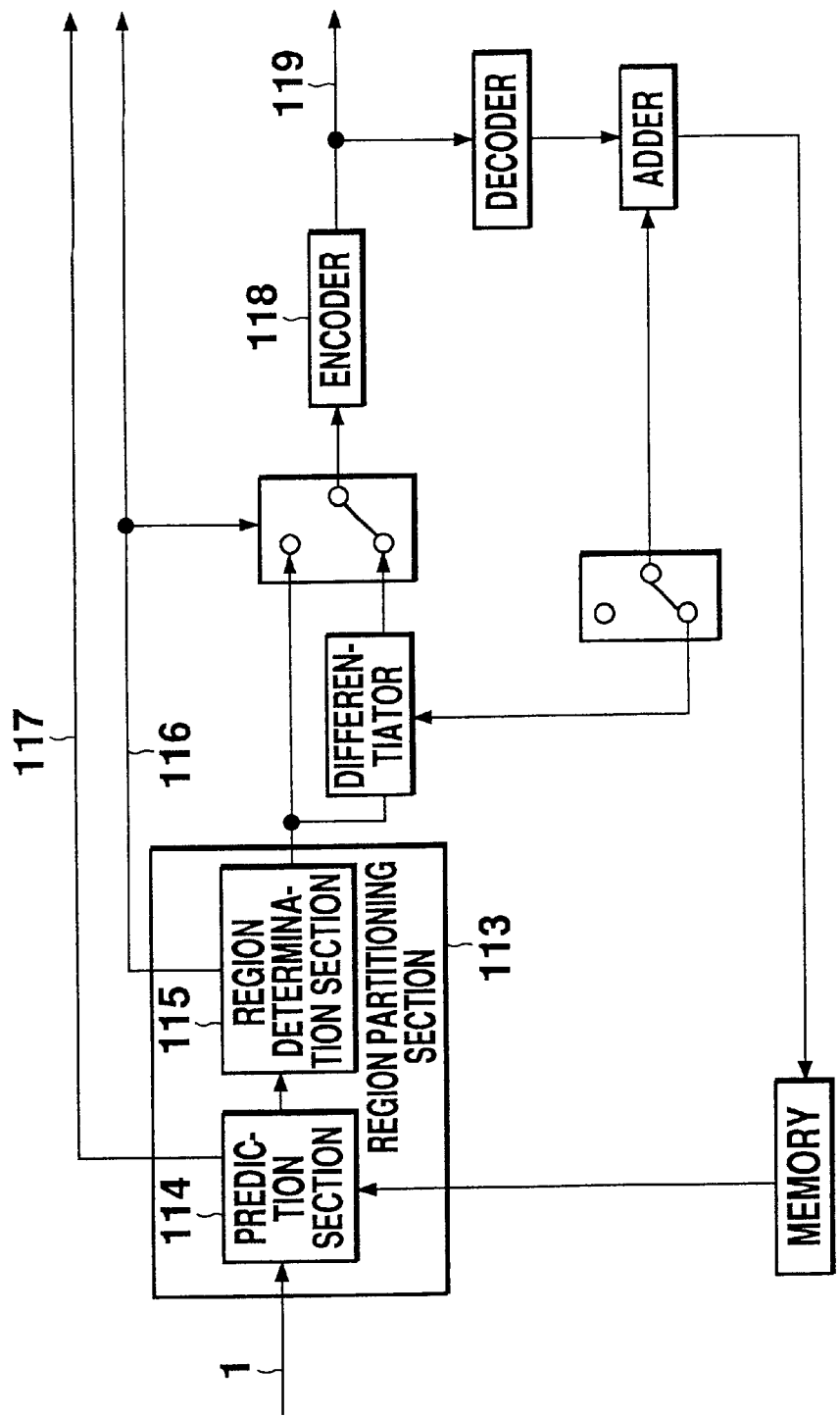
FIG. 2 shows a moving image encoding apparatus relating to a second prior art.

Although initial partitioning is performed in the partitioning processing section 12 in this embodiment, this section or the like can be provided outside the region partitioning section 2. With that arrangement, the initial partitioning is done outside the moving image encoding apparatus shown in FIG. 1 and a pre-partitioned image is directly input to the region partitioning section 2.

Second Embodiment

Figure 16:
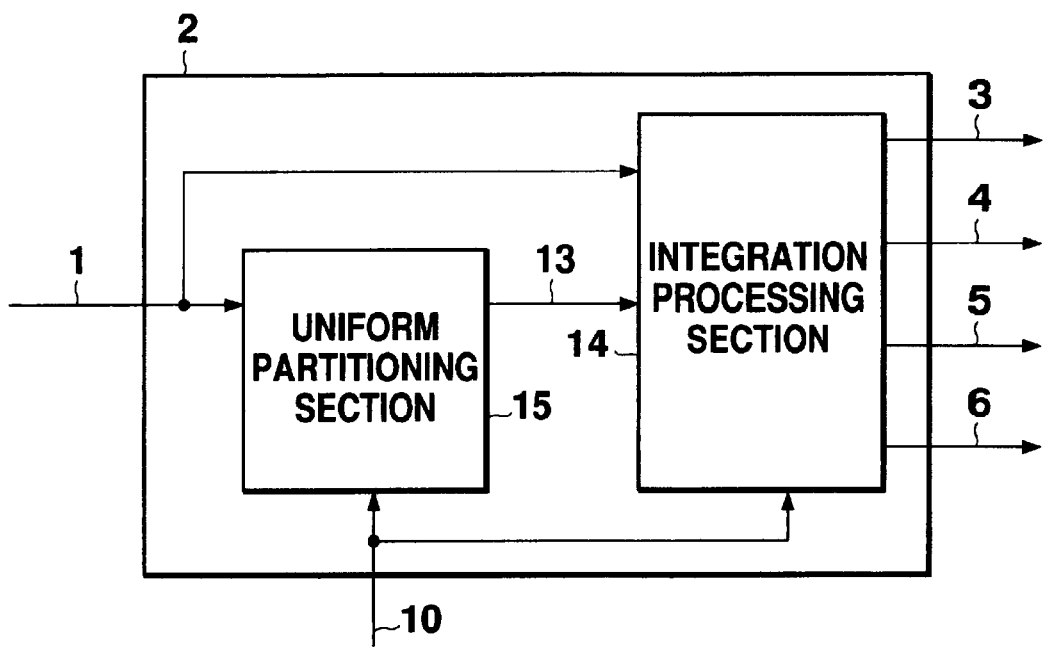
FIG. 16 is an internal block diagram of another embodiment of the partitioning processing section of FIG. 5.
Figure 17:
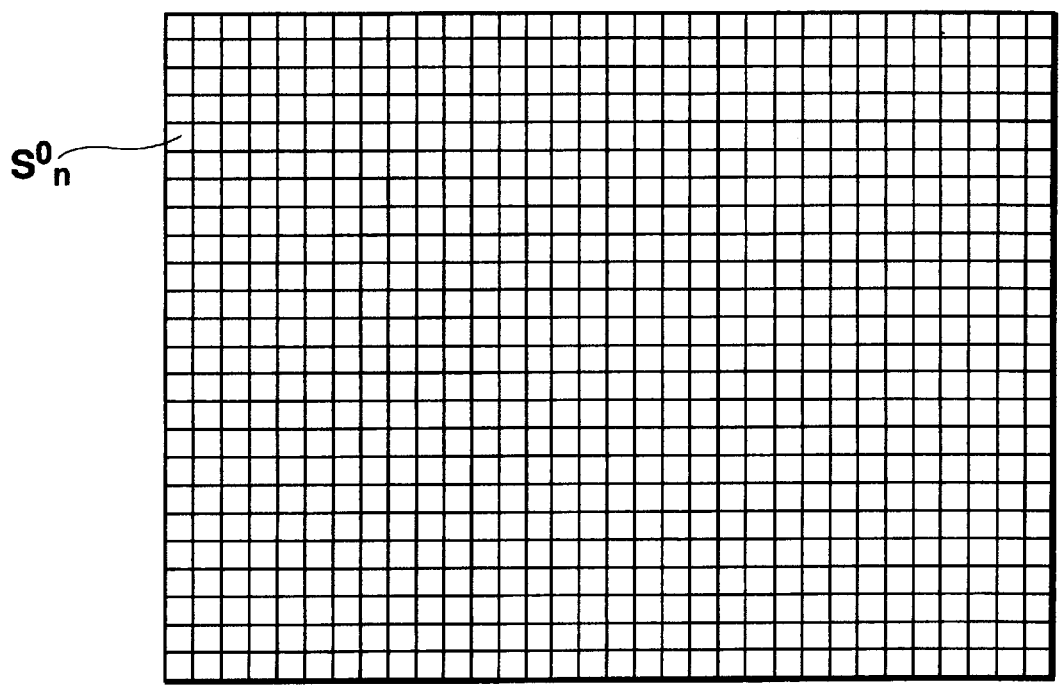
FIG. 17 shows a final result of initial partitioning in the partitioning processing section of FIG. 16.

This embodiment relates to an apparatus wherein region partitioning section 2 of the first embodiment has been partially modified. FIG. 16 is an internal block diagram of region partitioning section 2 in this embodiment. As shown in this diagram, region partitioning section 2 of the second embodiment has a configuration wherein partitioning processing section 12 of FIG. 5 has been replaced by uniform partitioning section 15. As shown in FIG. 17, a threshold judgment of the activity is not performed in the initial partitioning process in this configuration, and uniform partitioning is unconditionally performed in square blocks of minimum region area. This minimum region area may be made selectable.

Setting of the threshold is unnecessary in this embodiment, and region partitioning is performed only for amount of code—distortion cost as the evaluation value. Therefore, the procedure associated with threshold setting becomes unnecessary, as do activity calculation and comparison judgment processing. Thus, this embodiment can be used in addition to the first embodiment in order to lighten the computational load relating to these processes.

Third Embodiment

In the partitioning process of this embodiment, a judgment is made as to whether or not partitioning is possible, not only including the activity, but also including an index (hereinafter called a class) indicating the importance of the region. It is preferable to perform detailed encoding for regions having high importance, and to reduce region areas. Regions having low importance are made as large as possible so as to reduce the amount of code per pixel.

The activity is, for example, a closed, local statistical value within the region. On the other hand, the classes in this embodiment are based on the features of the image spanning regions. In this embodiment, the classes are defined on the basis as to what degree a person views the region, namely, a person's degree of observation, due to the object structure traversing the region. For example, when the edge distribution of a given region spans a wide range and the connection with adjacent regions is strong, it is highly possible the region is located at the boundary of an object.

Figure 18:
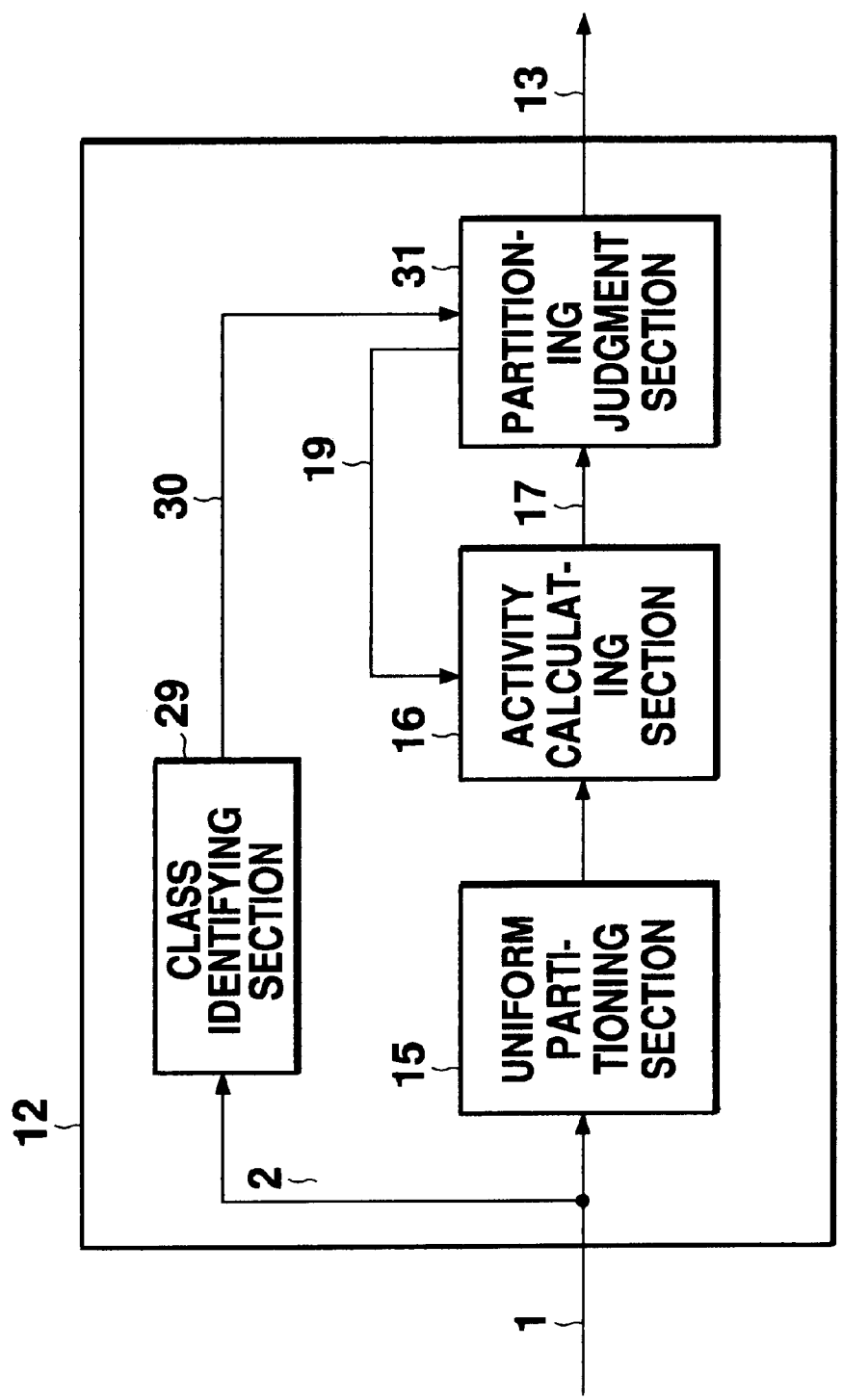
FIG. 18 is an internal block diagram of another embodiment of the partitioning processing section of FIG. 5.
Figure 19:
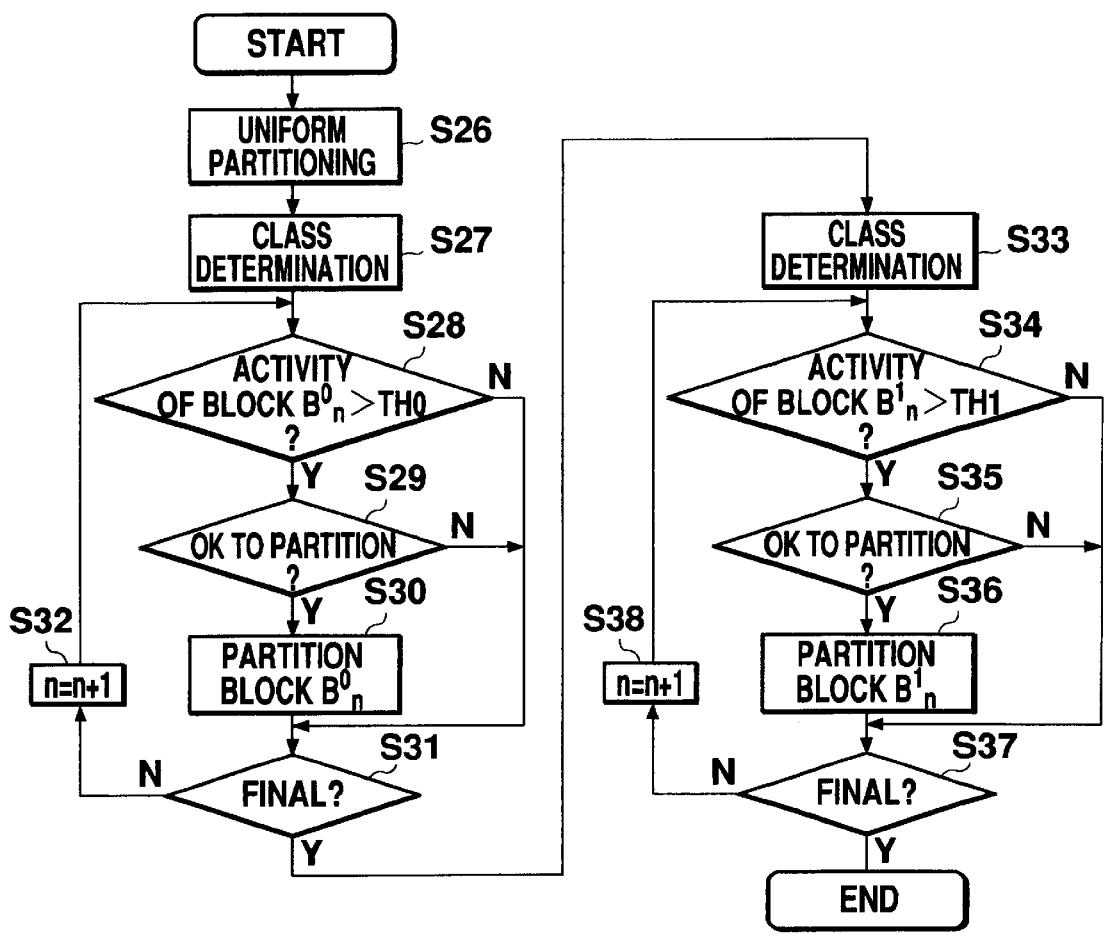
FIG. 19 is a flowchart showing an operation of the partitioning processing section of FIG. 18.

FIG. 18 is an internal block diagram of partitioning processing section 12 in this embodiment. Besides that shown, the configuration is identical to that of the first embodiment and the following description centers on the differences from the first embodiment. In the same diagram, numeral 29 indicates a class identifying section, numeral 30 indicates a class identifier, and numeral 31 indicates a partitioning judgment section. FIG. 19 is a flowchart showing an operation of partitioning processing section 12 shown in FIG. 18.

As shown in FIG. 19, uniform partitioning (S26) is first performed. Hereafter, class 30 of each region is determined (S27) by class identifying section 29. Class identifying section 29 determines the class by evaluating magnitude a of the dispersion within the region, state $\beta$ of the edge distribution within the region (includes edge direction and distribution area), and connectivity $\gamma$ of the edges with adjacent regions. For example, a region having a dispersion a that is less than a predetermined value is set as the lowest class (class A), while the edge distribution $\beta$ within the region is further determined for regions having dispersion a that is larger than the predetermined value. The determination of $\beta$ can be accomplished, for example, by the previously mentioned Sobel operator. If $\beta$ is less than the predetermined value, the region is considered to be a small area having an independent edge rather than an object boundary, then set as an intermediate class (class B). When $\beta$ is to a certain extent large, connectivity $\gamma$ is evaluated, and if $\gamma$ is large, the region is classified into the most important class (class C).

After classification into classes, activity 17 is calculated in activity calculating section 16, and a threshold judgment relating to the activity is first performed (S28) by partitioning judgment section 31. For a region judged here to require partitioning, a judgment is made for permission to partition based on class 30 (S29). Thus, partitioning judgment section 31 holds a criterion in advance which defines to what extent of size a region of each class is to be partitioned. If permission is granted for partitioning with regard to a class, the region is partitioned (S30). This is performed for all regions, and the same partitioning process is also performed for the newly created partitioned regions (S33 to S38).

According to this embodiment, the encoding of images can be performed while taking into consideration the features of images spanning multiple regions, particularly the outlines of objects. Control is possible so that regions with a low degree of observation are roughly encoded to reduce the amount of information, and the amount of information reduced is applied to regions having a high degree of observation.

Fourth Embodiment

The degree of observation of the person was employed in class determination in the third embodiment. In this embodiment, features of a known image are stored, and classes are determined according to the degree of coincidence between the stored features and the features calculated from each region.

For example, for images of faces, considerable research has been conducted, and many techniques have been proposed for digitizing face structures. Once these features are stored, a person's face (generally having high importance) can be detected from within the image. For other objects, there are also many instances where they can be described by features based on luminance and texture information. In order to clearly express a person's face, the region having features coinciding with features of the person's face is set as the most important class A, while other regions are set as class B of normal importance.

Figure 20:
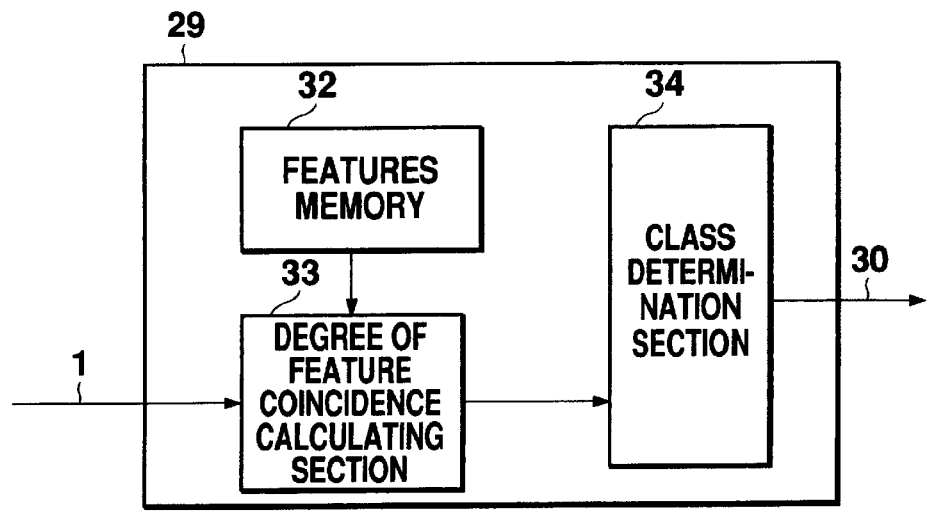
FIG. 20 shows another embodiment of the class identifying section of FIG. 18.

FIG. 20 is a block diagram of class identifying section 29 in this embodiment. The other blocks are equivalent to those in the third embodiment. In FIG. 20, numeral 32 indicates a features memory, numeral 33 indicates a degree of feature coincidence calculating section, and numeral 34 indicates a class determination section.

Features memory 32 holds the features relating to objects for each object classified into classes. Degree of feature coincidence calculating section 33 calculates the degree of coincidence of input image 1 and the features of the object classified into classes. The degree of coincidence is determined, for example, as an error between the features of input image 1 and the features within features memory 32. Next, the object having the highest degree of coincidence is detected by class determination section 34, and the concerned regions are classified into that object class.

According to this embodiment, the identification or detection of objects becomes possible depending on features of the image. Image quality can be further improved where necessary. The classification of objects into classes may be performed according to the features associated with the person's degree of observation, in which case encoding can be performed while taking into consideration human visual characteristics with respect to the image.

Fifth Embodiment

Encoding distortion during the integration process was taken into consideration in the first embodiment. In this embodiment, encoding distortion in the partitioning process stage is taken into consideration.

Figure 22:
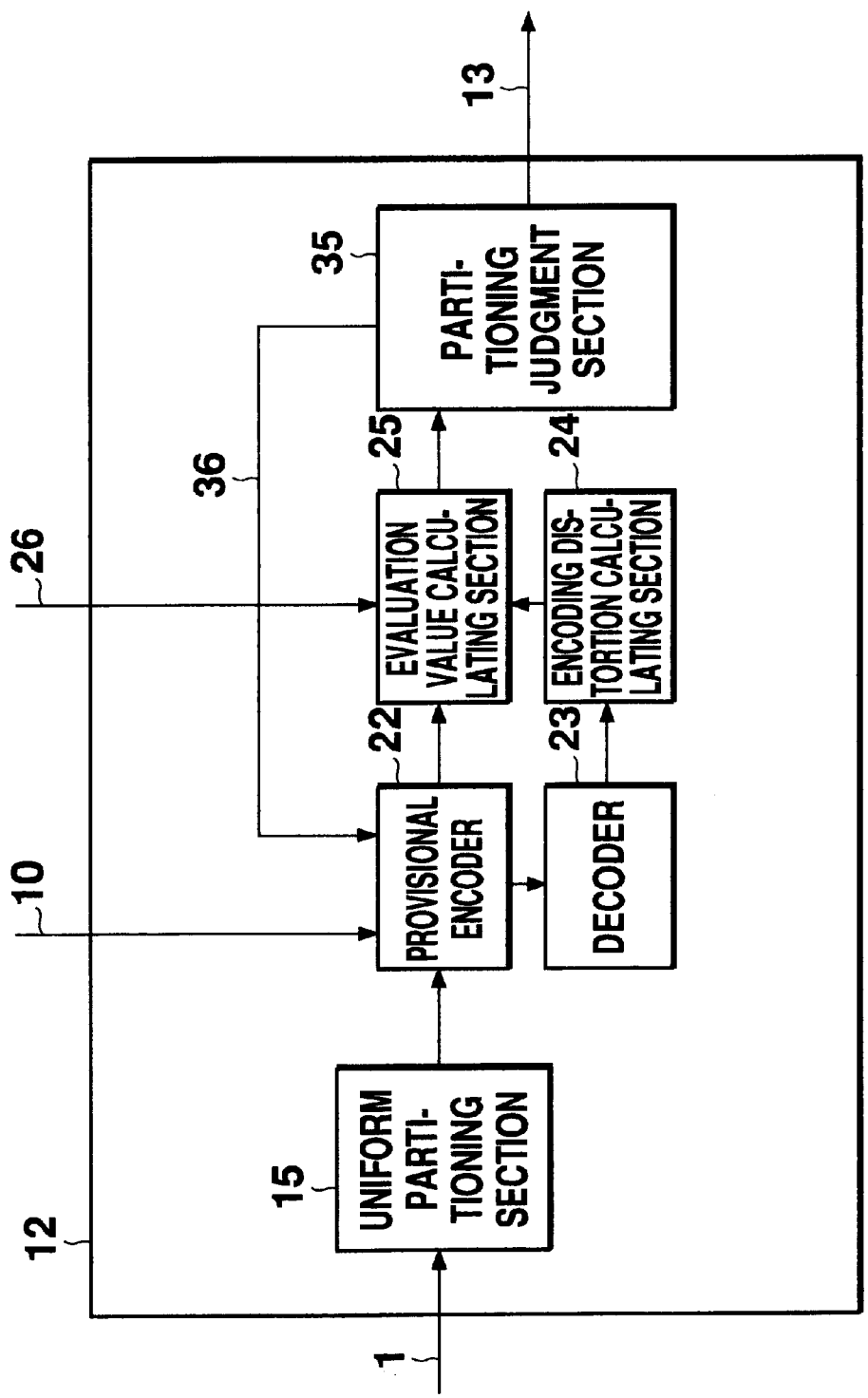
FIG. 22 is an internal block diagram of another embodiment of the partitioning processing section of FIG. 5.
Figure 23:
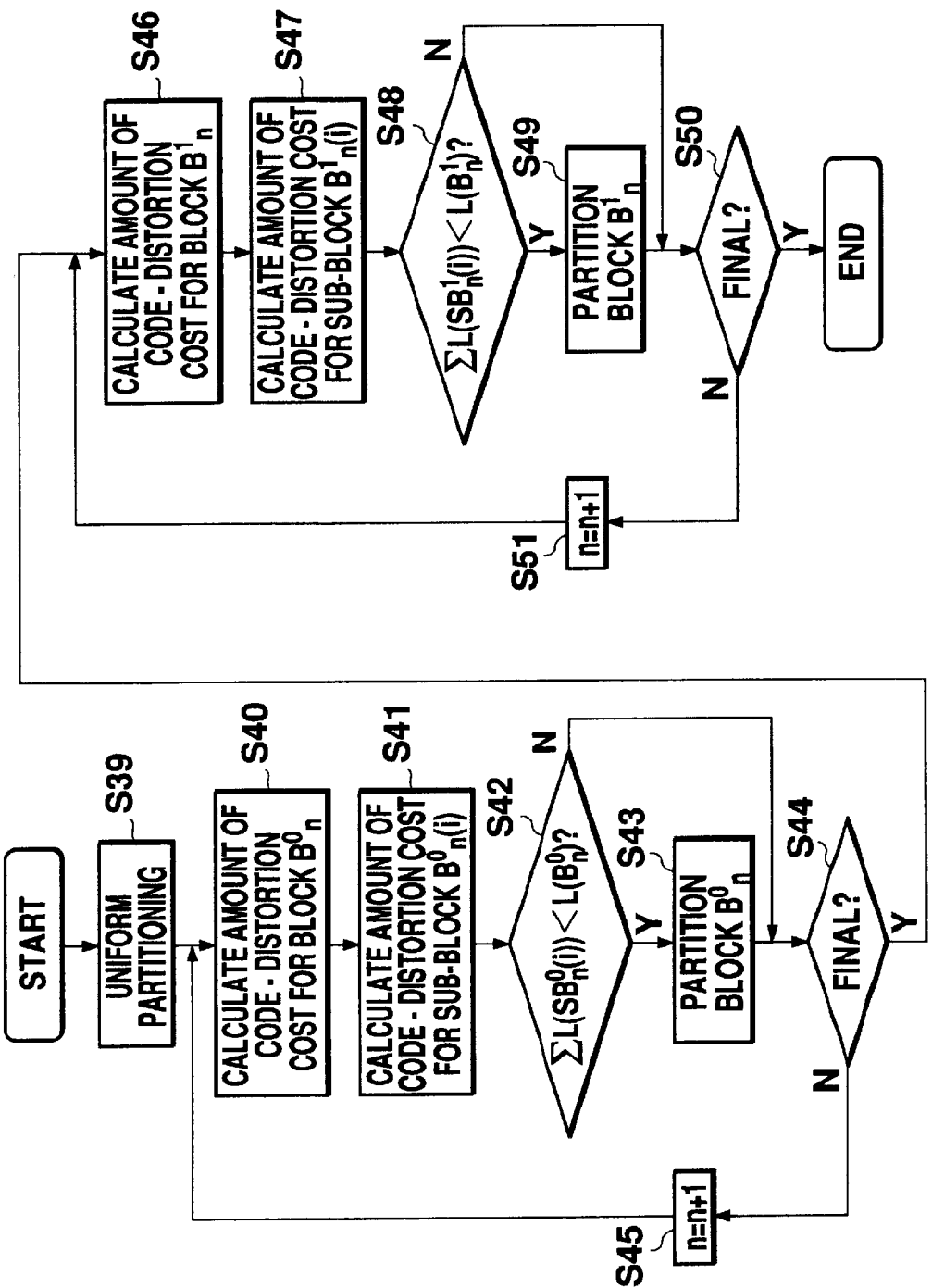
FIG. 23 is a flowchart showing an operation of the partitioning processing section of FIG. 22.

FIG. 22 is an internal block diagram of partitioning processing section 12 in this embodiment, wherein numeral 35 indicates a partitioning judgment section and numeral 36 indicates a partitioning process iteration instruction signal. FIG. 23 is a flowchart showing an operation of partitioning processing section 12 of FIG. 22.

Partitioning processing section 12 of this embodiment employs formula 1 that was introduced in the first embodiment. Through the use of this formula, the initial partitioning process is performed in a direction of reducing the summation of $L(S_n^k)$ within the frame so that the encoding distortion can be reduced when the same amount of code is used.

As shown in FIG. 23, uniform block partitioning is first performed (S39) in uniform partitioning section 15, for example, so that the state of FIG. 8 is obtained. This corresponds to the $0^{th}$ partitioning stage. The number of blocks obtained at this time is denoted by $N_0$ and each block is denoted by $B_n^0$ ($1 \leq n \leq N_0$). A judgment is made for each $B_n^0$ as to whether or not to perform further block partitioning. A comparison is made between $L(B_n^0)$ relating to $B_n^0$ and the summation of $L(SB_n^0(i))$ relating to each sub-block $SB_n^0(i)$ ($1 \leq i \leq 4$) obtained after $B_n^0$ is partitioned into four parts. Partitioning is permitted if the latter is smaller.

In calculating the amount of code—distortion cost, encoding of $B_n^0$ and $SB_n^0(i)$ is first performed in provisional encoder 22. Next, in decoder 23, the local decoded images of $B_n^0$ and $SB_n^0(i)$ are generated from the encoded data obtained from provisional encoder 22. Next, the distortion between the local decoded images and the original image, $D(B_n^0)$ and $D(SB_n^0(i))$, are calculated by encoding distortion calculating section 24. Evaluation value calculating section 25 calculates $L(B_n^0)$ and $L(SB_n^0(i))$ from amount of code $R(B_n^0)$ and $R(SB_n^0(i))$ and encoding distortion $D(B_n^0)$ and $D(SB_n^0(i))$ (S40, S41).

Partitioning judgment section 35 compares $L(B_n^0)$ and the summation of the four sub-blocks of $L(SB_n^0(i))$ (i=1, 2, 3, 4) (S42), and partitions $B_n^0$ into four parts of $SB_n^0(i)$ if the latter is smaller (S43). This corresponds to the $1^{st}$ s partitioning stage. The blocks partitioned into $SB_n^0(i)$ are newly denoted by $B_n^1$ ($1 \leq n \leq N_1$), and the same partitioning judgment is performed with respect to $B_n^1$ (S46 to S51). Subsequently, the same partitioning process is performed a predetermined number of times. The partitioned state shown in FIG. 10, for example, is achieved as a result.

Since activity-related operations are not performed in this embodiment, this embodiment is particularly advantageous if importance is placed on reducing the amount of operations.

Sixth Embodiment

Figure 24:
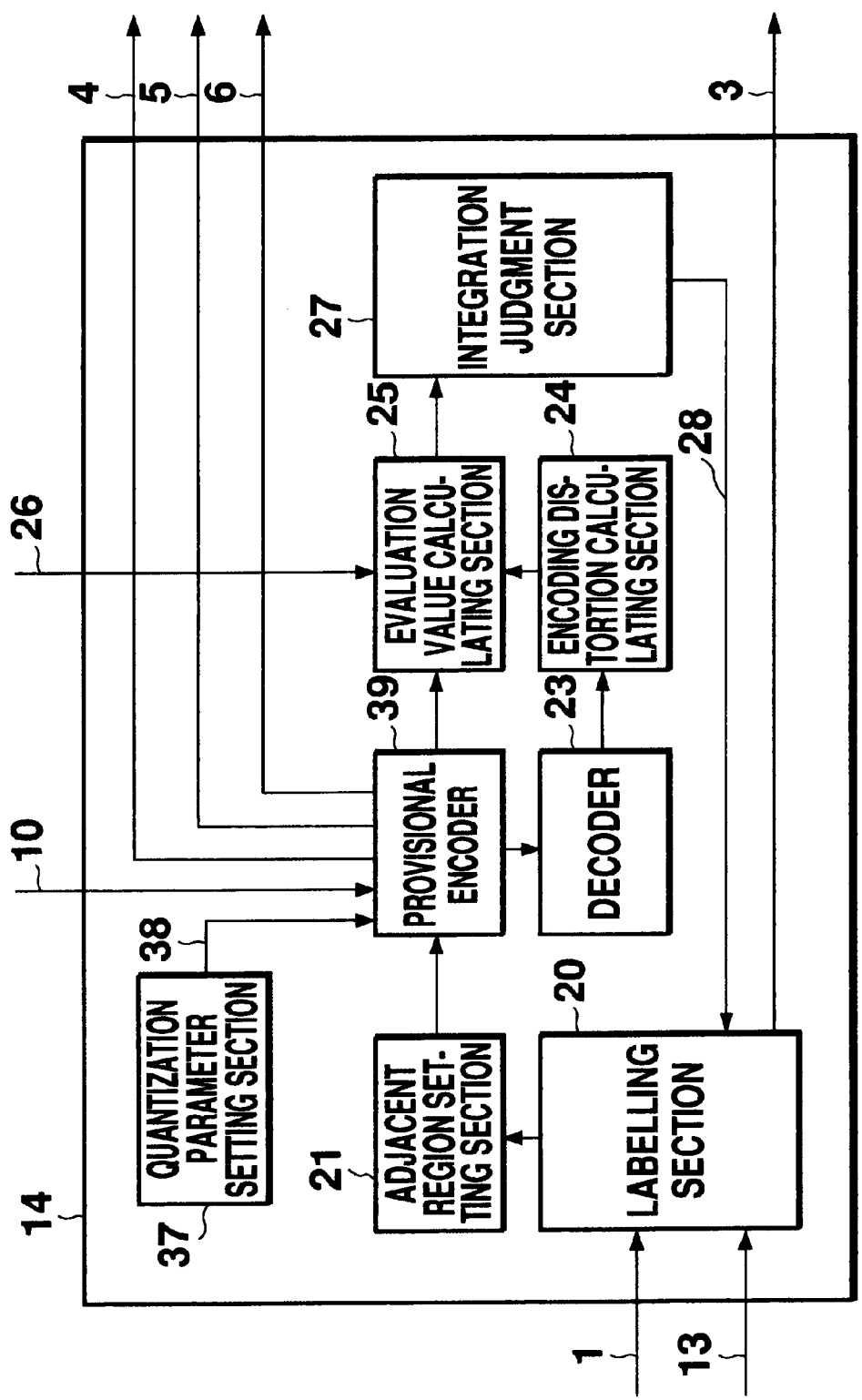
FIG. 24 is an internal block diagram of another embodiment of the integration processing section of FIG. 5.

Another example of integration processing section 14 shown in FIG. 11 of the first embodiment is described. FIG. 24 is an internal block diagram of integration processing section 14 of this embodiment wherein numeral 37 indicates a quantization parameter setting section, numeral 38 indicates a quantization parameter, and numeral 39 indicates a provisional encoder. The operation of integration processing section 14 is basically the same as shown in FIG. 12, with the exception of S19.

Figure 25:
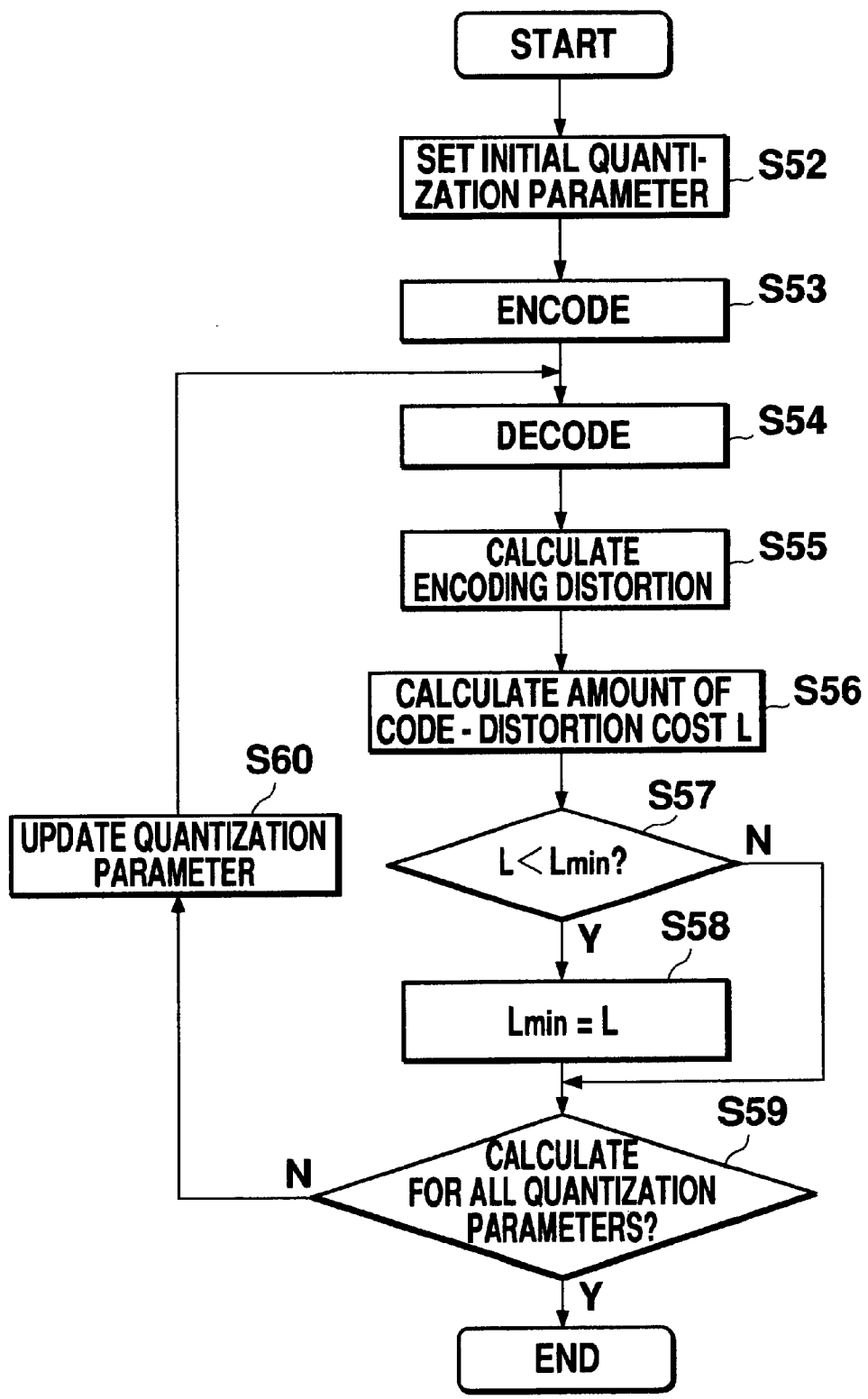
FIG. 25 is a flowchart showing an operation of the integration processing section of FIG. 24.

FIG. 25 is a flowchart showing a process of evaluation value calculation corresponding to S19. The evaluation value calculation is performed by provisional encoder 39, decoder 23, encoding distortion calculating section 24, and evaluation value calculating section 25.

First, an initial parameter value is set in quantization parameter setting section 37 and output (S52) to provisional encoder 39. Next, encoding of region $S_n^k$ is performed (S53) in provisional encoder 39. During encoding, quantization is performed using the set quantization parameter.

Decoder 23 generates the local decoded image of $S_n^k$ from the encoded data obtained in this manner (S54). Next, distortion $D(S_n^k)$ between the local decoded image and the original image is calculated (S55) at encoding distortion calculating section 24. Evaluation value calculating section calculates $L(S_n^k)$ from amount of code $R(S_n^k)$ and encoding distortion $D(S_n^k)$ (S56). The value of cost obtained from the initial calculation is held as Lmin, after which the quantization parameter is varied and the same cost calculation is performed. Because varying the quantization parameter changes the balance between the amount of code and distortion, the parameter for when the amount of code—distortion cost is at a minimum is employed, resulting in amount of code—distortion cost $L(S_n^k)$ of region $S_n^k$ (S57 to S60). The remainder is the same as the first embodiment.

According to this embodiment, an optimum integration process is achieved while taking into consideration the quantization parameter. This method of including the quantization parameter is also applicable to the partitioning process based on the amount of code—distortion cost described in the fifth embodiment.

Seventh Embodiment

Figure 26:
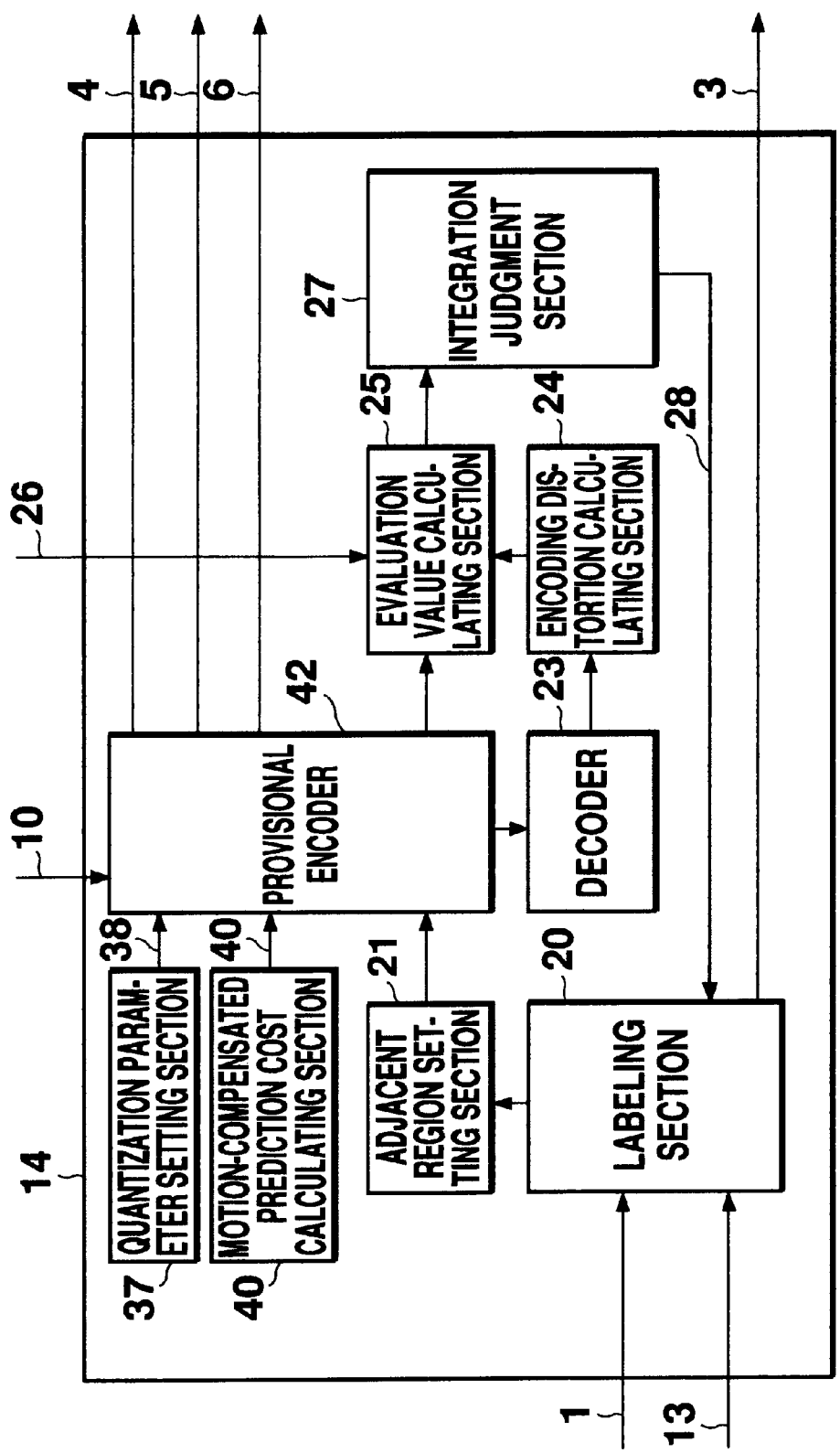
FIG. 26 is an internal block diagram of another embodiment of the integration processing section of FIG. 5.

Yet another example of the sixth embodiment is described in this embodiment. FIG. 26 is an internal block diagram of integration processing section 14 of this embodiment wherein numeral 40 indicates a motion-compensated prediction cost calculating section, numeral 41 indicates a motion-compensated prediction cost, and numeral 42 indicates a provisional encoder.

Provisional encoder 42 uses encoding based on motion-compensated prediction to determine the motion parameter. At this time, the motion-compensated prediction cost (formula 2) described in the first embodiment is used. In other words, determination of the motion parameter during temporary encoding is performed so that the cost is minimized by taking a balance between motion-compensation based matching distortion and the amount of code of the motion parameter. In concrete terms, in the encoding by provisional encoder 42, the motion parameter is determined from the value of cost that is calculated by motion-compensated prediction cost calculating section 40. The remainder of the process is similar to that of the sixth embodiment.

According to this embodiment, from a given constant $\lambda$, the region shape can be determined while minimizing the overall amount of code—distortion cost from motion compensation to encoding. As a result, the encoding distortion based on a predetermined amount of code can be reduced.

Eighth Embodiment

Figure 27:
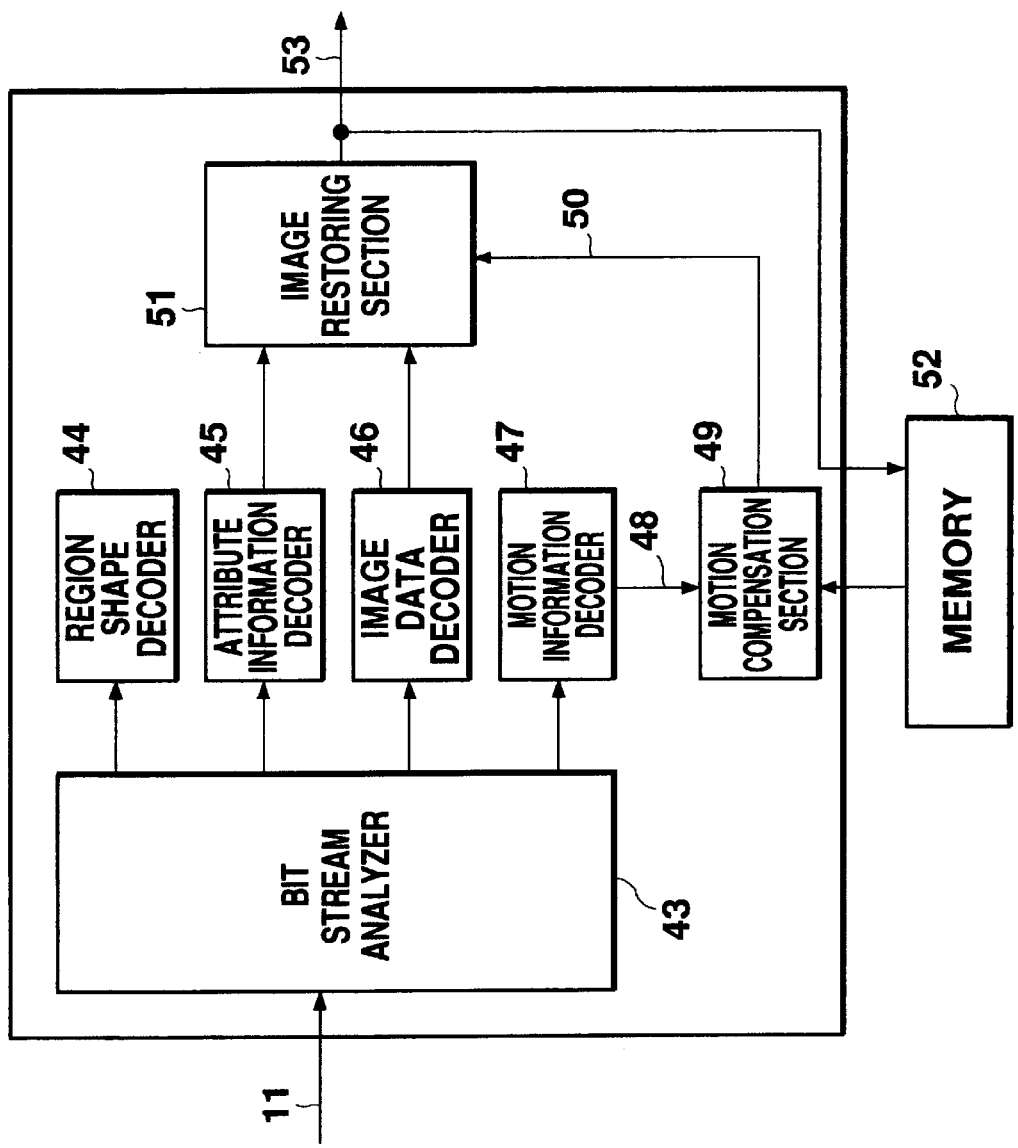
FIG. 27 is an internal block diagram of a moving image decoding apparatus relating to the embodiment.

In this embodiment, a moving image decoding apparatus is described for decoding encoded bit streams that are generated by various moving image encoding apparatuses. FIG. 27 shows a configuration of the decoding apparatus wherein numeral 43 indicates a bit stream analyzer, numeral 44 indicates a region shape decoder, numeral 45 indicates an attribute information decoder, numeral 46 indicates an image data decoder, numeral 47 indicates a motion information decoder, numeral 48 indicates a motion parameter, numeral 49 indicates a motion compensation section, numeral 50 indicates a prediction image, numeral 51 indicates an image decoder, numeral 52 indicates an external memory, and numeral 53 indicates a reproduced image.

This decoding apparatus decodes encoded bit streams consisting of region shape information representing region partitioned state related to an image frame or partial image within an image frame (referred to as "image frames and the like" hereinafter), image data for regions encoded by a predetermined method, attribute information of regions, and motion information of regions; restores region images; and reproduces image frames and the like.

For this embodiment, the description method for region shape information differs from general conventional methods in that non-rectangular shaped regions are generated in the process of encoding. The description method employed in this embodiment is based on i) explicit coordinates of vertices of each region,
ii) explicit process in encoding when regions are partitioned or integrated, or the like. In the method of ii), for example, the number of the region partitioned in the $i^{th}$ partitioning stage and the number of the region integrated in the $j^{th}$ integration stage for arbitrary i and j are noted. As in the encoding apparatus, the $0^{th}$ partitioning stage is first performed according to FIG. 8 at the decoding apparatus, after which the final partitioned state can be restored by following the identical procedure as the encoding apparatus. In the method of ii), the amount of data is generally small compared to a method of directly noting the coordinate data.

Figure 28:
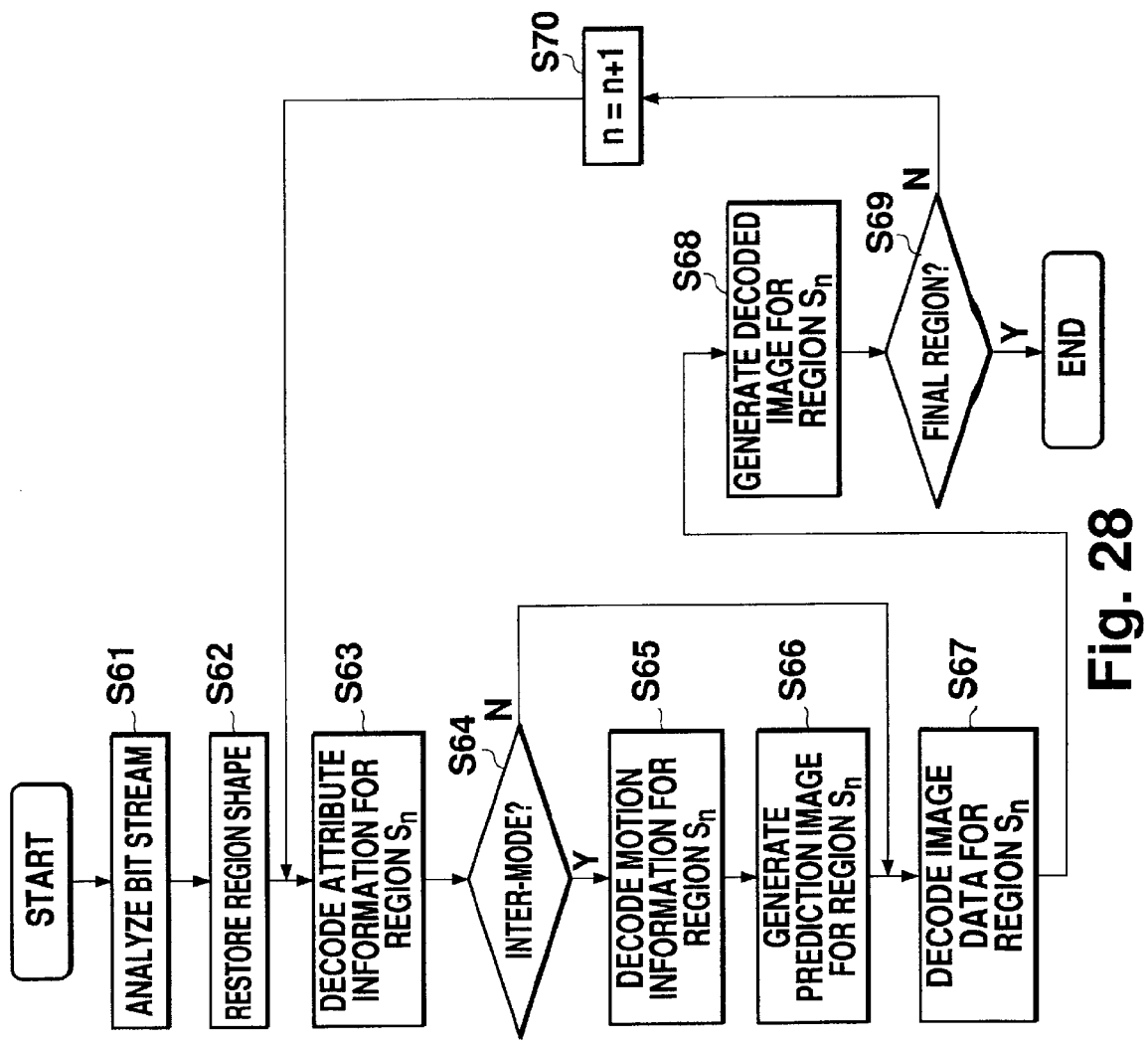
FIG. 28 is a flowchart showing an operation of the decoding apparatus of FIG. 24.

FIG. 28 is a flowchart showing an operation of this decoding apparatus. Encoded bit stream 11 is first input by bit stream analyzer 43 wherein the bit stream is converted to encoded data (S61). Among the encoded data, the region shape information is decoded in region shape decoder 44, and the region partitioned state is restored (S62) for image frames and the like using the above-mentioned method. By restoring the region, the encoded sequence of region information encoded in subsequent bit streams is identified. The regions are designated $S_n$.

Next, the data of regions is decoded in sequence from the bit stream according to the encoded sequence. First, the attribute information for region $S_n$ is decoded by attribute information decoder 45, and the encoding mode information for the region is decoded (S63). If the current mode is inter-mode (inter-frame encoding mode), namely, a mode in which the prediction error signal is encoded (S64), motion parameter 48 is decoded in motion information decoder 47 (S65). Motion parameter 48 is sent to motion compensation section 49 and, based on this, motion compensation section 49 calculates a memory address corresponding to the prediction image among reference images stored in external memory 52, and retrieves prediction image 50 from external memory 52 (S66). Next, the image data for region $S_n$ is decoded in image data decoder 46 (S67). In the case of inter-mode, the decoded image data and prediction image 50 are added to obtain the final reproduced image for region $S_n$.

On the other hand, in the case of intra-mode (intra-frame encoding mode), the decoded image data directly becomes the final reproduced image 53 for region $S_n$. The reproduced image is used as the reference image for subsequent prediction image generation so is written to external memory 52. This judgment and restoration of the reproduced image are performed in image decoder 51 (S68).

The series of processes terminates when it is performed for all regions included in image frames and the like. Similar processes may be also performed for other subsequent image frames and the like.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. An apparatus for encoding an image signal, said apparatus comprising: a region partitioning section which includes:

a partitioning processing section partitioning the image signal into a first plurality of regions based on a partition judgment criterion; and an integration processing section integrating each region of said first plurality of regions with adjacent regions to convert said first plurality of regions into a second plurality of regions, wherein said integration processing section includes;

a provisional encoder preliminarily encoding an image per region of said first plurality of regions and calculating the amount of code thereof;

a decoder decoding the image encoded by said provisional encoder;

an encoding distortion calculating section calculating encoding distortion by using the image decoded by said decoder; and an evaluation value calculating section calculating an evaluation value for judging merit of encoding while taking into consideration both said amount of code and said encoding distortion, wherein it is determined for each region of said first plurality of regions whether or not to perform integration based on a result of comparing the evaluation value that is obtained in the case where said each region is integrated with adjacent regions and the evaluation value that is obtained in the case where said each region is not integrated with adjacent regions; and an encoder separately encoding each region of said second plurality of regions.

2. An apparatus for encoding an image signal, said apparatus comprising:

a region partitioning section which includes:

a partitioning processing section partitioning the image signal into a first plurality of regions based on a partition judgment criterion, wherein said partitioning processing section includes:

an activity calculating section calculating prediction error power accompanying motion-compensated prediction of each region as an activity of the region; and a partitioning judgment section comparing the calculated activity with a criterion -value that was set in advance, wherein said partition processing section further partitions regions having activity greater than said criterion value into smaller regions; and an integration processing section integrating each region of said first plurality of regions with adjacent regions to convert said first plurality of regions into a second plurality of regions; and an encoder separately encoding each region of said second plurality of regions.

3. An apparatus for encoding an image signal, said apparatus comprising:

a region partitioning section which includes:

a partitioning processing section partitioning the image signal into a first plurality of regions based on a partition judgment criterion, wherein said partitioning processing section includes:

an activity calculating section calculating edge intensity of an original signal for each region as the activity of the region; and a partitioning judgment section comparing the calculated activity with a criterion value that was set in advance, wherein said partition processing section further partitions regions having activity greater than said criterion value into smaller regions; and an integration processing section integrating each region of said first plurality of regions with adjacent regions to convert said first plurality of regions into a second plurality of regions; and an encoder separately encoding each region of said second plurality of regions.

4. An apparatus for encoding an image signal, said apparatus comprising:

a region partitioning section which includes:

a partitioning processing section partitioning the image signal into a first plurality of regions based on a partition judgment criterion, wherein said partitioning processing section includes:

an activity calculating section calculating, for each region, a linear sum of a plurality of numeric values indicating the characteristics of the image of the region; and a partitioning judgment section comparing the calculated activity with a criterion value that was set in advance, wherein said partition processing section further partitions regions having activity greater than said criterion value into smaller regions; and an integration processing section integrating each region of said first plurality of regions with adjacent regions to convert said first plurality of regions into a second plurality of regions; and an encoder separately encoding each region of said second plurality of regions.

5. An apparatus as in claim 4 wherein said plurality of numeric values includes a prediction error power and a motion parameter of each region which accompany motion-compensated prediction.

6. An apparatus as in claim 4 wherein said plurality of numeric values includes amount of code of a motion parameter of each region, a prediction error power which accompanies motion compensation, a dispersion value of an original signal, edge intensity, and magnitude of the motion parameter of each region.

7. An apparatus as in claim 2 wherein said partitioning processing section further includes a class identifying section and judges whether or not to partition each region on the basis of both said activity and class.

8. An apparatus as in claim 7 wherein said class identifying section observes an object structure spanning a plurality of regions and decides classes for the regions.

9. An apparatus as in claim 8 wherein said object structure is judged on the basis of original signal dispersion of the region, edge intensity, and degree of connection of the edge with adjacent regions.

10. An apparatus as in claim 7 wherein said class identifying section observes features of an image; performs detection of objects; and, based on the results thereof, decides classes for the regions.

11. An apparatus as in claim 10 wherein said class identifying section stores in advance, for each object predicted to be included in the image, features of the image including the object, and determines the class of each region based on degree of coincidence of the features of the image of each region and the stored features of the object.

12. An apparatus for encoding an image signal, said apparatus comprising:

a region partitioning section which includes:

a partitioning processing section partitioning the image signal into a first plurality of regions based on a partition judgment criterion, wherein said partitioning processing section includes:

a provisional encoder preliminarily encoding the image for each region and calculating the amount of code thereof;

a decoder decoding the image encoded by the provisional encoder;

an encoding distortion calculating section calculating an encoding distortion using the image that was decoded by the decoder; and an evaluation value calculating section calculating the evaluation value for judging merit of encoding while taking into consideration both the amount of code and the encoding distortion, wherein it is determined for each region whether or not to perform partitioning for the region based on a result comparing the evaluation value that is obtained in the case where the region is further partitioned into smaller regions and the evaluation value that is obtained in the case where the region is not further partitioned into smaller regions; and an integration processing section integrating each region of said first plurality of regions with adjacent regions to convert said first plurality of regions into a second plurality of regions; and an encoder separately encoding each region of said second plurality of regions.

13. An apparatus as in claim 1 wherein a quantization parameter of a prediction error signal accompanying motion-compensated prediction is variably set in said provisional encoder, and said evaluation value calculating section calculates the evaluation value while varying the quantization parameter.

14. An apparatus as in claim 1 wherein an evaluation value calculating section for obtaining as an evaluation value a linear sum of the prediction error power and the amount of code of motion parameter of each region accompanying motion-compensated prediction is disposed in a stage prior to that of said provisional encoder, and said provisional encoder detects the motion parameter based on the evaluation value.

15. An apparatus for decoding encoded data of an image, the image being encoded after being partitioned into a first plurality of regions and after the first plurality of regions are transformed into a final set of regions, wherein at least one of the final set of regions is formed by integrating two or more regions of the first plurality of regions based on predetermined criteria, the final set of regions including at least two different regions, the encoded data including region shaping information, said apparatus for decoding comprising:

an input receiving the encoded data including the region shaping information representing said region integration process based on said predetermined criteria;

a region shape restoring section operatively connected to said input, said region shape restoring section operatively arranged to restore the final set of regions, based on the received region shaping information, said restored final set of regions, including at least two different regions; and a coded data decoder operatively connected to said region shape restoring section, said coded data decoder decoding encoded data corresponding to regions of said restored final set of regions to facilitate deriving the image therefrom.

16. A method for decoding encoded data of an image, the image being encoded after being partitioned into a first plurality of regions and after the first plurality of regions are transformed into a final set of regions, wherein at least one of the final set of regions is formed by integrating two or more regions of the first plurality of regions based on predetermined criteria, the final set of regions including at least two different regions, the encoded data including region shaping information, said method comprising the steps of:

receiving the encoded data including the region shaping information representing said region integration process based on said predetermined criteria;

restoring the final set of regions based on the received region shaping information, said restored final set of regions including at least two different regions; and decoding encoded data corresponding to regions of said restored final set of regions to facilitate deriving the image therefrom.

17. An apparatus for decoding encoded data of an image, the image being encoded after being partitioned into a first plurality of regions and after the first plurality of regions are transformed into a final set of regions, wherein at least one of the final set of regions is formed by recursive integration of two or more regions of the first plurality of regions based on predetermined criteria, the final set of regions including at least two different regions, the encoded data including region shaping information, said apparatus for decoding comprising:

an input receiving the encoded data including the region shaping information;

a region shape restoring section operatively connected to said input, said region shape restoring section operatively arranged to restore the final set of regions, based on the received regions shaping information, said restored final set of regions, including at least two different regions; and a coded data decoder operatively connected to said region shape restoring section, said coded data decoder decoding encoded data corresponding to regions of said restored final set of regions to facilitate deriving the image therefrom.

18. A method for decoding encoded data of an image, the image being encoded after being partitioned into a first plurality of regions and after the first plurality of regions are transformed into a final set of regions, wherein at least one of the final set of regions is formed by recursive integration of two or more regions of the first plurality of regions based on predetermined criteria, the final set of regions including at least two different regions, the encoded data including region shaping information, said method for decoding comprising:

receiving the encoded data including the region shaping information;

restoring the final set of regions based on the received region shaping information, said restored final set of regions including at least two different regions; and decoding encoded data corresponding to regions of said restored final set of regions to facilitate deriving the image therefrom.

* * * * *